US012118440B2

United States Patent
Scavo

(10) Patent No.: US 12,118,440 B2
(45) Date of Patent: *Oct. 15, 2024

(54) AUTOMATED ORDER EXECUTION BASED ON USER PREFERENCE SETTINGS UTILIZING A NEURAL NETWORK PREDICTION MODEL

(71) Applicant: Nowcasting.ai, Inc., New York, NY (US)

(72) Inventor: Damian Ariel Scavo, Assisi (IT)

(73) Assignee: Nowcasting.ai, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,675

(22) Filed: Nov. 12, 2021

(65) Prior Publication Data

US 2022/0121992 A1   Apr. 21, 2022

Related U.S. Application Data

(63) Continuation of application No. 17/315,122, filed on May 7, 2021, now Pat. No. 11,205,186.
(Continued)

(51) Int. Cl.
*G06Q 40/04* (2012.01)
*G06F 16/215* (2019.01)
(Continued)

(52) U.S. Cl.
CPC .......... *G06N 20/00* (2019.01); *G06F 16/215* (2019.01); *G06F 16/2465* (2019.01);
(Continued)

(58) Field of Classification Search
CPC ......... G06Q 40/06; G06Q 40/00; G06Q 40/04
See application file for complete search history.

(56) References Cited

U.S. PATENT DOCUMENTS 5,544,281 A  *  8/1996  Maruoka ................ G06Q 40/04
                                                         706/58
5,761,442 A     6/1998  Barr et al.
(Continued)

FOREIGN PATENT DOCUMENTS

GB    2253081 A    2/1992
JP    200741869 A  2/2007

OTHER PUBLICATIONS

Carta, S. M. et al., "Explainable Machine Learning Exploiting News and Domain-Specific Lexicon for Stock Market Forecasting," vol. 9, 2021, pp. 30193-30205.
(Continued)

*Primary Examiner* — Scott L Jarrett
(74) *Attorney, Agent, or Firm* — Procopio, Cory, Hargreaves & Savitch LLP

(57) ABSTRACT

A computer-implemented method comprising receiving user preference information, based on the received user preference information, determining one or more user settings, processing data to determine a data condition, wherein, to determine the data condition, a plurality of alternate data inputs of different types are processed and normalized, and applied to a series of operations to generate a forecast having a degree of confidence, and the data condition is compared with third party information; providing an electronic notification indicative of the data condition to the user device, wherein the electronic notification includes the data condition compared with the third party information, a confidence indicator associated with the data condition, and a user prompt; in response to a single user input, the user device generating an instruction to execute the user request; and based on the instruction, executing the user request based on the determined one or more user settings.

14 Claims, 30 Drawing Sheets

Related U.S. Application Data

(60) Provisional application No. 63/171,967, filed on Apr. 7, 2021, provisional application No. 63/021,550, filed on May 7, 2020.

(51) Int. Cl.

| | | |
|---|---|---|
| *G06F 16/2458* | (2019.01) | |
| *G06F 16/25* | (2019.01) | |
| *G06F 16/28* | (2019.01) | |
| *G06N 3/08* | (2023.01) | |
| *G06N 20/00* | (2019.01) | |
| *G06Q 10/0633* | (2023.01) | |
| *G06Q 10/0639* | (2023.01) | |
| *G06Q 30/0202* | (2023.01) | |
| *G06Q 30/0282* | (2023.01) | |
| *G06Q 40/06* | (2012.01) | |
| *G06Q 40/12* | (2023.01) | |
| *H04L 67/55* | (2022.01) | |
| *G06N 3/084* | (2023.01) | |

(52) U.S. Cl.
CPC ......... *G06F 16/254* (2019.01); *G06F 16/258* (2019.01); *G06F 16/285* (2019.01); *G06N 3/08* (2013.01); *G06Q 10/0633* (2013.01); *G06Q 10/06393* (2013.01); *G06Q 30/0202* (2013.01); *G06Q 30/0282* (2013.01); *G06Q 40/04* (2013.01); *G06Q 40/06* (2013.01); *H04L 67/55* (2022.05); *G06N 3/084* (2013.01); *G06Q 40/12* (2013.12)

(56) References Cited

U.S. PATENT DOCUMENTS

| | | | |
|---|---|---|---|
| 6,134,535 A | 10/2000 | Belzerg | |
| 6,249,768 B1 | 6/2001 | Tulskie, Jr. | |
| 6,418,419 B1 | 7/2002 | Nieboer et al. | |
| 6,484,151 B1 | 11/2002 | O'Shaughnessy | |
| 6,493,681 B1 | 12/2002 | Tertitski et al. | |
| 6,604,104 B1 | 8/2003 | Smith | |
| 6,941,287 B1 | 9/2005 | Vaidyanathan | |
| 7,107,232 B2 * | 9/2006 | Morris | G06Q 40/04 705/37 |
| 7,177,831 B1 | 2/2007 | O'Shaughnessy | |
| 7,212,997 B1 | 5/2007 | Pine et al. | |
| 7,249,080 B1 | 7/2007 | Hoffman et al. | |
| 7,392,212 B2 | 6/2008 | Hancock | |
| 7,467,108 B2 | 12/2008 | Papka | |
| 7,496,531 B1 | 2/2009 | Gastineau et al. | |
| 7,539,637 B2 | 5/2009 | Gatto | |
| 7,555,456 B2 | 6/2009 | Rosenthal | |
| 7,571,139 B1 | 8/2009 | Giordano et al. | |
| 7,617,136 B1 | 11/2009 | Lessing | |
| 7,620,586 B2 | 11/2009 | Rosenthal | |
| 7,624,172 B1 | 11/2009 | Austin-Lane | |
| 7,627,517 B2 | 12/2009 | Badenhorst | |
| 7,640,206 B1 | 12/2009 | O'Connor | |
| 7,698,170 B1 | 4/2010 | Darr | |
| 7,734,533 B2 * | 6/2010 | Mackey, Jr. | G06Q 40/04 705/37 |
| 7,801,801 B2 * | 9/2010 | Rosenthal | G06Q 40/04 705/37 |
| 7,818,232 B1 | 10/2010 | Mead et al. | |
| 7,827,087 B2 * | 11/2010 | Adatia | G06Q 40/04 705/37 |
| 7,831,493 B1 | 11/2010 | Bakaya et al. | |
| 7,860,774 B1 | 12/2010 | Peterson et al. | |
| 7,877,309 B2 | 1/2011 | Gatto et al. | |
| 7,962,398 B1 | 6/2011 | Swearingen et al. | |
| 7,966,234 B1 | 6/2011 | Merves | |
| 8,026,794 B1 | 9/2011 | Oakes, III | |
| 8,352,354 B2 | 1/2013 | Sylvester | |
| 8,396,792 B1 | 3/2013 | Wilkes et al. | |
| 8,630,937 B1 | 1/2014 | Zerenner et al. | |
| 8,738,487 B1 | 5/2014 | Schmidt et al. | |
| 9,652,803 B2 | 5/2017 | Lane et al. | |
| 9,747,642 B1 | 8/2017 | Counihan | |
| 9,798,788 B1 | 10/2017 | Reiner et al. | |
| 10,032,180 B1 | 7/2018 | Shariff et al. | |
| 10,135,936 B1 | 11/2018 | Venuraju et al. | |
| 10,192,265 B2 | 1/2019 | Carragher | |
| 10,360,631 B1 | 7/2019 | Jezewski | |
| 10,497,060 B2 | 12/2019 | Khatami | |
| 10,592,912 B1 | 3/2020 | Chang et al. | |
| 10,956,986 B1 | 3/2021 | Ran et al. | |
| 10,963,799 B1 | 3/2021 | Aravala et al. | |
| 10,970,781 B2 | 4/2021 | Walden et al. | |
| 11,055,754 B1 | 7/2021 | Khapre et al. | |
| 11,176,495 B1 | 11/2021 | Ron et al. | |
| 11,205,186 B2 * | 12/2021 | Scavo | G06N 20/00 |
| 11,315,182 B2 * | 4/2022 | Friedman | G06Q 40/06 |
| 11,392,858 B2 * | 7/2022 | Scavo | G06Q 10/0633 |
| 11,416,779 B2 * | 8/2022 | Scavo | G06F 16/285 |
| 2002/0007335 A1 | 1/2002 | Millard et al. | |
| 2002/0023045 A1 | 2/2002 | Feilbogen et al. | |
| 2002/0052827 A1 | 5/2002 | Waelbroeck et al. | |
| 2002/0128954 A1 | 9/2002 | Evans | |
| 2002/0174081 A1 * | 11/2002 | Charbonneau | G06Q 40/04 706/15 |
| 2002/0198889 A1 | 12/2002 | Vishnubhotla | |
| 2003/0004853 A1 | 1/2003 | Ram et al. | |
| 2003/0018550 A1 | 1/2003 | Rotman et al. | |
| 2003/0023542 A1 | 1/2003 | Kemp et al. | |
| 2003/0033179 A1 | 2/2003 | Katz et al. | |
| 2003/0040955 A1 | 2/2003 | Anaya et al. | |
| 2003/0055768 A1 | 3/2003 | Anaya et al. | |
| 2003/0069822 A1 | 4/2003 | Ito | |
| 2003/0069834 A1 | 4/2003 | Cutler | |
| 2003/0078865 A1 | 4/2003 | Lee | |
| 2003/0126069 A1 | 7/2003 | Cha | |
| 2003/0167224 A1 | 9/2003 | Periwal | |
| 2003/0203713 A1 | 10/2003 | Onishi | |
| 2004/0266491 A1 | 12/2004 | Howard et al. | |
| 2005/0015323 A1 | 1/2005 | Myr | |
| 2005/0090911 A1 | 4/2005 | Ingargiola et al. | |
| 2005/0091146 A1 | 4/2005 | Levinson | |
| 2005/0273409 A1 * | 12/2005 | Voudrie | G06Q 40/12 705/36 R |
| 2005/0273412 A1 | 12/2005 | Voudrie | |
| 2005/0273413 A1 | 12/2005 | Vaudrie | |
| 2005/0273418 A1 | 12/2005 | Campbell | |
| 2006/0026088 A1 | 2/2006 | Grossman et al. | |
| 2006/0047590 A1 * | 3/2006 | Anderson | G06Q 40/06 705/35 |
| 2006/0106743 A1 | 5/2006 | Horvitz | |
| 2006/0117303 A1 | 6/2006 | Gizinski | |
| 2006/0224400 A1 | 10/2006 | Chkodrov et al. | |
| 2007/0088653 A1 | 4/2007 | Ginsberg et al. | |
| 2007/0150842 A1 | 6/2007 | Chaudhri | |
| 2007/0162365 A1 | 7/2007 | Weinreb | |
| 2007/0198450 A1 | 8/2007 | Khalsa | |
| 2007/0226024 A1 | 9/2007 | Harvey et al. | |
| 2007/0265908 A1 | 11/2007 | Berkman et al. | |
| 2007/0282730 A1 | 12/2007 | Carpenter et al. | |
| 2008/0071588 A1 | 3/2008 | Eder | |
| 2008/0177670 A1 | 7/2008 | Reid | |
| 2008/0288889 A1 | 11/2008 | Hunt | |
| 2008/0301061 A1 | 12/2008 | Kittelsen | |
| 2009/0292651 A1 | 11/2009 | Duquette | |
| 2010/0049664 A1 | 2/2010 | Kuo | |
| 2010/0100470 A1 | 4/2010 | Buchanan et al. | |
| 2010/0332412 A1 | 12/2010 | Park | |
| 2011/0167022 A1 | 7/2011 | Mura | |
| 2012/0072512 A1 | 3/2012 | Lazaridis et al. | |
| 2012/0123994 A1 | 5/2012 | Lowry et al. | |
| 2012/0226645 A1 | 9/2012 | O'Rourke | |
| 2013/0073411 A1 | 3/2013 | Bhogal | |
| 2013/0073413 A1 | 3/2013 | Bhogal | |
| 2013/0117198 A1 | 5/2013 | Hogan | |
| 2013/0138577 A1 | 5/2013 | Sisk | |
| 2013/0138647 A1 * | 5/2013 | Falkenberg | G06F 16/951 707/736 |

(56) References Cited

U.S. PATENT DOCUMENTS

| | | |
|---|---|---|
| 2013/0144971 A1 | 6/2013 | Austin-Lane |
| 2013/0204663 A1 | 8/2013 | Kahlow |
| 2013/0325681 A1 | 12/2013 | Somashekar et al. |
| 2014/0172751 A1 | 6/2014 | Greenwood |
| 2014/0245784 A1 | 9/2014 | Proud |
| 2014/0278884 A1 | 9/2014 | Schuler et al. |
| 2014/0279701 A1 | 9/2014 | Farrow |
| 2014/0289165 A1 | 9/2014 | Dinesh Chheda |
| 2014/0358825 A1 | 12/2014 | Phillips |
| 2015/0012331 A1 | 1/2015 | Carter et al. |
| 2015/0032595 A1* | 1/2015 | Koo ................. G06Q 40/04 705/37 |
| 2015/0058195 A1 | 2/2015 | Comly et al. |
| 2015/0120384 A1 | 4/2015 | Gerard et al. |
| 2015/0120849 A1 | 4/2015 | Thies et al. |
| 2015/0220937 A1 | 8/2015 | Iannace |
| 2015/0220951 A1 | 8/2015 | Kurapati et al. |
| 2015/0356679 A1 | 12/2015 | Schmitt |
| 2015/0356690 A1 | 12/2015 | Celikyilmaz et al. |
| 2016/0217366 A1* | 7/2016 | Li ................. G06Q 40/06 |
| 2016/0225017 A1 | 8/2016 | Wong et al. |
| 2016/0292612 A1 | 10/2016 | Hegarty |
| 2016/0343080 A1 | 11/2016 | Weng et al. |
| 2017/0070484 A1 | 3/2017 | Kruse et al. |
| 2017/0091792 A1 | 3/2017 | Gupta et al. |
| 2017/0177655 A1 | 6/2017 | Farrell et al. |
| 2017/0178247 A1 | 6/2017 | Farrell et al. |
| 2017/0293849 A1 | 10/2017 | Hodjat et al. |
| 2017/0372420 A1 | 12/2017 | Albin et al. |
| 2018/0129961 A1* | 5/2018 | Kailas ................. G06F 16/244 |
| 2018/0225767 A1 | 8/2018 | Tanaka |
| 2019/0026834 A1 | 1/2019 | Tanaka |
| 2019/0130487 A1 | 5/2019 | De Beer |
| 2019/0251626 A1 | 8/2019 | Jezewski |
| 2019/0266668 A1 | 8/2019 | Vail |
| 2019/0287044 A1 | 9/2019 | Mantel |
| 2019/0347668 A1 | 11/2019 | Williams |
| 2019/0347733 A1 | 11/2019 | Sasaki |
| 2019/0361860 A1 | 11/2019 | Rogynskyy |
| 2019/0370731 A1 | 12/2019 | Mota Manhaes et al. |
| 2019/0378048 A1 | 12/2019 | Shrivastava et al. |
| 2019/0385237 A1 | 12/2019 | Wetton |
| 2020/0074486 A1 | 3/2020 | Motohashi |
| 2020/0090273 A1 | 3/2020 | Katoh |
| 2020/0134640 A1 | 4/2020 | Morgan et al. |
| 2020/0202436 A1 | 6/2020 | Krishnan |
| 2020/0265356 A1 | 8/2020 | Lee |
| 2020/0300656 A1 | 9/2020 | Weilert et al. |
| 2020/0364791 A1 | 11/2020 | Taylor et al. |
| 2020/0366654 A1 | 11/2020 | De Beer |
| 2021/0004716 A1 | 1/2021 | Song et al. |
| 2021/0056636 A1 | 2/2021 | Scavo |
| 2021/0090173 A1 | 3/2021 | Steffes |
| 2021/0125207 A1 | 4/2021 | Banerjee |
| 2021/0125277 A1 | 4/2021 | Yim et al. |
| 2021/0133670 A1 | 5/2021 | Cella |
| 2021/0166251 A1 | 6/2021 | Mehmanpazir et al. |
| 2021/0174449 A1 | 6/2021 | Thomas |
| 2021/0350281 A1 | 11/2021 | Scavo |
| 2021/0350394 A1 | 11/2021 | Scavo |
| 2021/0350426 A1* | 11/2021 | Scavo ................. G06F 16/258 |
| 2021/0350460 A1 | 11/2021 | Scavo |
| 2022/0051321 A1 | 2/2022 | Campbell |

OTHER PUBLICATIONS

Notice of Allowance for related Application No. JP 2021-152987, mailed Feb. 22, 2022, 2 pages.

Fleder, Michael, "Forecasting Financials and Discovering Menu Prices with Alternative Data," Massachusetts Institute of Technology, Thesis, Sep. 2019, pp. 1-105.

Fleder, Michael et al., "Forecasting with Alternative Data," Proceedings of ACM Meas. Anal. Computer System, vol. 3, No. 3, Dec. 2019, pp. 1-29.

Wu, Dingming et al., "A Labeling Method for Financial Time Series Prediction Based on Trends," Entropy, vol. 22, No. 1162, 2020, dated Oct. 15, 2020, pp. 1-27.

Fan, Dongjie, "Retail Revenue Prediction Models with Spatial Data Science," Spatial Data, Carto.com, dated Sep. 26, 2019.

Cabena, Peter et al., Intelligent Miner for Data Applications Guide, IBM, Mar. 1999, pp. 1-159.

"Model beats Wall Street analysts in forecasting business financials," Massachusetts Institute of Technology, dated Dec. 19, 2019.

Curuksu, Jeremy, "Forecasting financial time series with dynamic deep learning on AWS," AWS Machine Leaning Blog, dated Aug. 20, 2018.

Yao, Jintao et al., "Forecasting and Analysis of Marketing Data Using Neural Networks," National University of Singapore, Journal of Information Science and Engineering, vol. 14, 1998, pp. 843-862.

Garlapati, Harsha Vardhan, "The Role of Mathematics in Machine Learning", published Jul. 13, 2023 by Knowledgehut, accessed Aug. 8, 2023 from https://www.knowledgehut.com/blog/data-science/importance-of-maths-in-machine-learning. (Year: 2023), in 8 pages.

Active Trader Pro—User Guide Fidelity Investments, 2014 (Year: 2014).

Singh, Aishwarya, "Stock Prices Prediction Using Machine Learning and Deep Learning Techniques" Analtics Vidhya, Oct. 25, 2018 (Year: 2018).

"StockMarketEye User's Guide—Release 4.2" TransparenTech, LLC, Nov. 16, 2017 (Year: 2017).

White, Spencer, "DreamTai Applies Neural Networks to Stock Picking for Small Traders Yahoo News!," Apr. 1, 2018 (Year: 2018).

* cited by examiner

| Watchlist | | | | |
|---|---|---|---|---|
| TRACK YOUR STOCKS | | | | |

Top Performers
CHECK THE PERFORMANCE RANKING

Alerts
UPGRADE TO PREMIUM

My Watchlist 701                                                                    Last Quarter (01-2021) >

| NAME | STOCK PRICE 703 | TYPE 705 | PERFORMANCE % 707 | SCORE 709 |
|---|---|---|---|---|
| TARGET CORPORATION (TGT) | 191.27 +2.97(1.51%) | REVENUES | +0.4% | NEUTRAL |
| NETFLIX INC (NFLX) | 579.84 -4.90(1.11%) | USERS | +3% | OVERPERFORMING |
| CHIPOTLE MEXICAN GRILL,INC,(CMG) | 1,503.68 +23.06(1.56%) | SAME STORE SALES | -10% | UNDERPERFORMING |
| HONDA MOTOR CO.LTD.(HMC) | 28.25 +.30(1.07%) | US REVENUES | +6.2% | OVERPERFORMING |
| FACEBOOK,INC(FB) | 272.87 +5.30(2.02%) | ENGAGEMENT | +3% | OVERPERFORMING |

(SYMBOL)

⚙ SETTINGS
☺ CUSTOMERS SUPPORT
⇥ LOG OUT

Nowcasting.ai — Summary | CHARTS — UPGRADE — James

— 901

Watchlist
TRACK YOUR STOCKS

Top Performers
CHECK THE PERFORMANCE RANKING

Alerts
UPGRADE TO PREMIUM

→ HMC - Honda Motor Co., LTD
NASDAQ

Revenue Forecast — 903

| | |
|---|---|
| THE REVENUE IMPACT ON THE STOCK PRICE IS | 60% |
| OUR PREDICTION ACCURACY FOR THIS STOCK IS | 97.1% |
| THE FORECAST BASED ON ANALYSTS' EXPECTATION IS | 2,772.49M |
| OUR FORECAST BASED ON REAL DATA MEASUREMENT IS | 2,943.08M |
| THE DIFFERENT OF 6.2% SUGGEST THAT THIS COMPANY IS | OVERPERFORMING |
| IN ONE YEAR, THEIR REVENUES CHANGED BY | -6.03% |

— 905

ADVISOR SCORE
STRONG BUY

NEXT EARING CALL
FEB 03, 2021

Charts — 907
Revenues | Stock

SETTINGS
CUSTOMERS SUPPORT
LOG OUT

Nowcasting.ai

Watchlist — TRACK YOUR STOCKS
Top Performers — CHECK THE PERFORMANCE RANKING
Alerts — UPGRADE TO PREMIUM

SETTINGS
CUSTOMERS SUPPORT
LOG OUT

UPGRADE — James

My alerts

| NAME | TYPE | CONDITION | FREQUENCY | ACTIVE |
|---|---|---|---|---|
| NETFLIX INC (NFLX) | PERFORMANCE | ABOVE 5% | ONCE | ⊙ ✎ 🗑 |
| HONDA MOTOR CO. LTD. (HMC) | PRICE | MOVES ABOVE 5% | RECURRING | ⊙ ✎ 🗑 |
|  | SCORE | OVERPERFORMING | RECURRING | ⊙ ✎ 🗑 |
| FACEBOOK, INC (FB) | EARNING CALL | 10D BEFORE | ONCE | ⊙ ✎ 🗑 |

⊙ Alerts

Most Popular

| NAME | TYPE | CONDITION | FREQUENCY | USERS |
|---|---|---|---|---|
| NETFLIX INC (NFLX) | PERFORMANCE | ABOVE 8% | ONCE | 130 + |
| HONDA MOTOR CO. LTD. (HMC) | PRICE | MOVES ABOVE 3% | RECURRING | 90 + |
|  | SCORE | OVERPERFORMING | RECURRING | 83 + |
| FACEBOOK, INC (FB) | EARNING CALL | 15D BEFORE | ONCE | 55 + |

| |
|---|
| DEBIT CARD PURCHASE CHIPOTLE 1846 MUNSTER IN |
| CHIPOTLE 0232 SPRINGDALE OH |
| DEBIT CARD PURCHASE CHIPOTLE 1942 SHERMAN OAKS CA |
| POS PURCHASE MERCHANT PURCHASE TERMINAL CHIPOTLE 0572 LEXINGTON KY 09-12-13 9253 |
| CHIPOTLE 1826 CHARLOTTE NC |
| CHIPOTLE 0394 COLORADO SPRICO |
| CHIPOTLE 0026 CHANDLER AZ 0 0079 |
| CHIPOTLE 1130 HARKER HEIGHTTX |
| CHIPOTLE 0106 ARLINGTON VA |
| CHIPOTLE 0648 KANSAS CITY MO |
| DEBIT CARD PURCHASE CHIPOTLE 1647 WOODLAND HILL CA |
| CHIPOTLE 1323 ARLINGTON TX |

FIG. 19

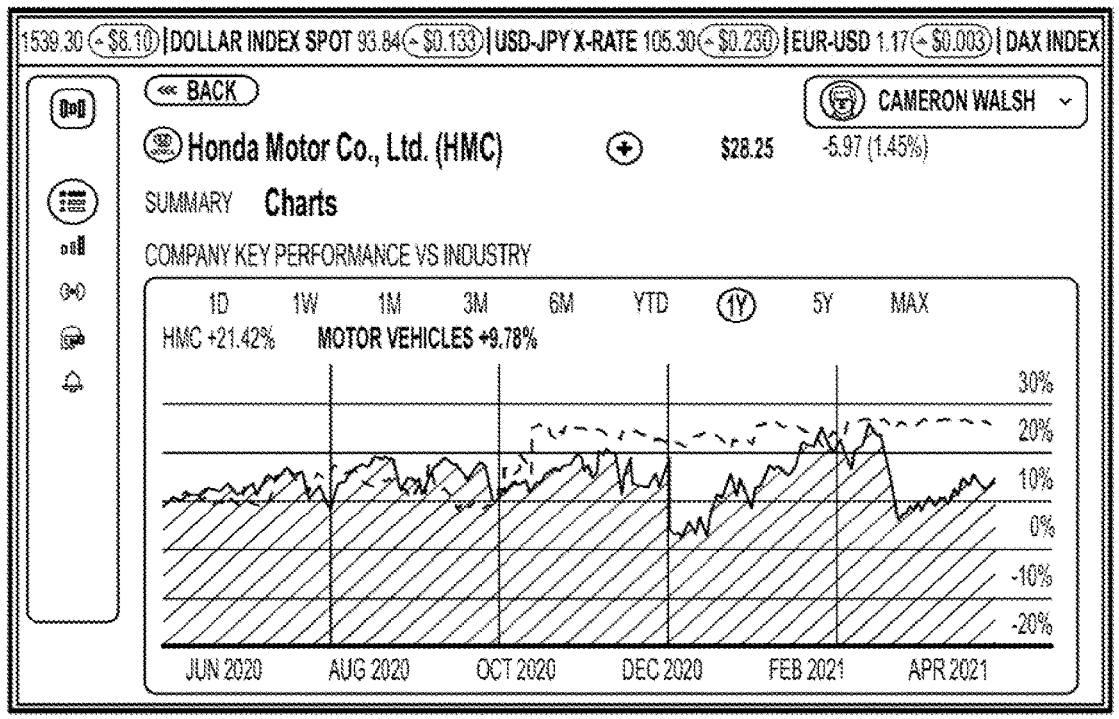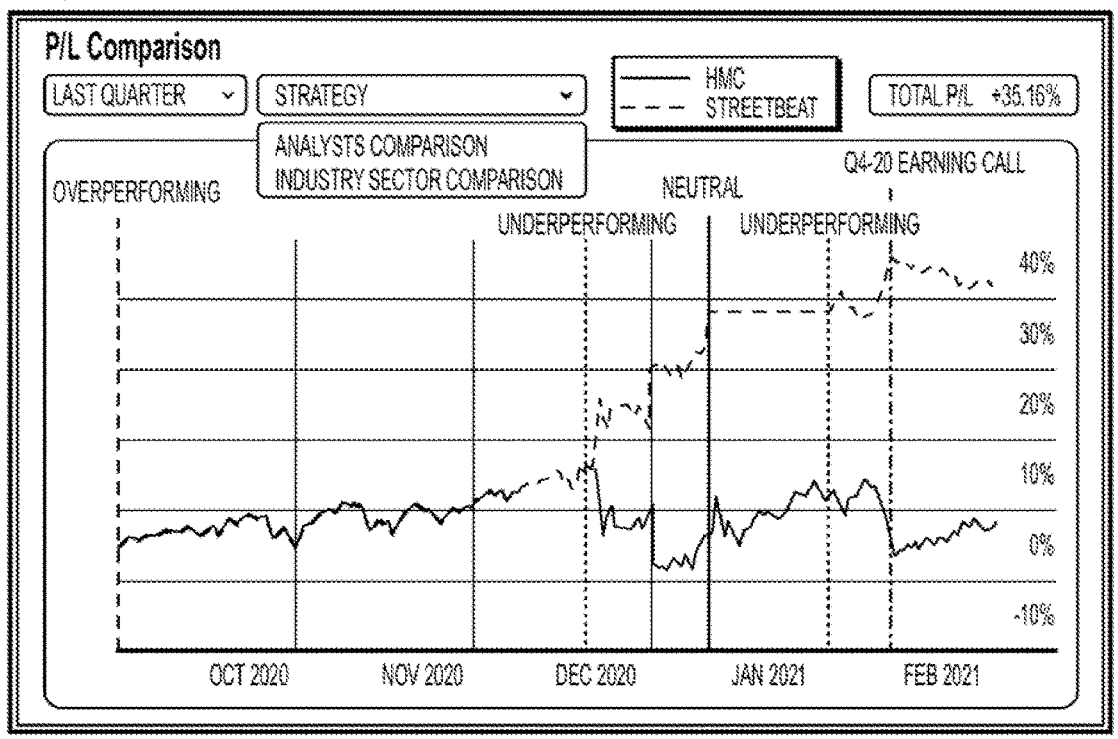
FIG. 28

AUTOMATED ORDER EXECUTION BASED ON USER PREFERENCE SETTINGS UTILIZING A NEURAL NETWORK PREDICTION MODEL

CROSS-REFERENCE TO RELATED APPLICATIONS

This application is continuation application of U.S. patent application Ser. No. 17/315,122 filed on May 7, 2021, which claims priority under 35 USC § 119(e) to U.S. Provisional Application Nos. 63/021,550 and 63/171,967, filed on May 7, 2020 and Apr. 7, 2021, respectively, the contents of which are incorporated herein by reference in their entirety.

BACKGROUND

Field

The present disclosure relates to systems and methods for providing support for a user to make a decision based on a single user action, and more specifically, to providing a system, method and user experience associated with a user making a decision, based on a push notification provided in response to a data condition and a user profile.

Related Art

In related art systems, data analysts typically study and analyze trends in economic data manually. For example, these analysts may study data in order to determine when to buy or sell a stock manually, or what the unemployment rate looks like at any given period.

However, the data used to determine these metrics may be unreliable due to the lack of availability of such proprietary information. For example, data which should not necessarily be correlated with a particular economic metric may not have been filtered out when analyzing the data, thereby introducing inaccuracies within the analysis.

Further, in the related art, a user may not be able to receive a push notification to make a decision with a single user action. Related art approaches may provide, by email or other means, information associated with an ambient condition, such as a stock price or overall market performance. However, the related art approaches do not take into account multiple data streams and as explained above, they also do not remove inaccuracies from the data. Thus, any information that the user receives is based on data is that may contain inaccuracies. Further, when provided with this information, the user cannot make a decision simply by providing a single user action. For example but not by way of limitation, a user must provide a service provider with detailed instructions, including but not limited to a stock to be purchased including the company name, a number of shares, a timing of the purchase, single versus multiple orders, etc. Such requirements cause inconvenience to a user, such that the user with limited time may not be able to engage in a desired number of transactions, and further, due to time limitations may miss the opportunity to make the transactions complete before the data condition changes, such as a rapid change in the stock price.

Thus, there is a need for reliable data, and reliable methods for analyzing the data to determine present and future trends in this data. Further, there is an unmet need for a user to be able to make, with a single action, and instruction or order to make a purchase.

SUMMARY OF THE DISCLOSURE

Aspects of the present application may include a computer-implemented method of executing a user request, the computer-implemented method comprising: receiving, by an online application associated with a user device, user preference information; based on the received user preference information, determining one or more user settings, wherein the one or more user settings is assembled and stored in a database, as a series of preferences, thresholds, or parameters, and in a machine readable form such that it can be accessed and applied to the user request, so that the user request is executed without user input of the user preferences at a time of the user request; processing data to determine a data condition, wherein, to determine the data condition, a plurality of alternate data inputs of different types are processed and normalized, and applied to a series of operations in order to generate a forecast or an expected value or a recommendation having a degree of confidence, and the data condition is compared with third party information; generating an electronic notification indicative of the data condition, and providing the electronic notification to the user device, wherein the electronic notification includes the data condition compared with the third party information, a confidence indicator associated with the data condition, and a user prompt to perform a single action; in response to a single user input to the user device to select the user prompt to perform the single action, the user device generating an instruction to execute the user request; and based on the instruction, executing the user request based on the determined one or more user settings that include information on whether the order is executed immediately or at a later time, whether the order is executed as a single transaction or a plurality of transactions, whether, if a plurality of transactions is requested, whether the timing and amount are evenly or unevenly distributed over the course of a time period, whether there are any price limits, or patterns in the case of an uneven distribution of the amount over the course of the time period, and an identity of the one or more brokers or the one or more markets.

According to some aspects, the user preference information comprises risk information, financial information, and demographic information received from the user via the online application.

According to further aspects, the risk information comprises a timing preference to execute the user request a frequency preference to execute the user request, an amount preference to execute the user request, a frequency preference over a prescribed period to execute the user request, and a broker and market preference associated with one or more respective brokers and markers, to execute the user request.

According to other aspects, the notification is provided to the user device via the online application on a periodic basis at a prescribed time.

According to still other aspects, the data condition is provided in the notification for a plurality of entities provided in the user preferences, and the user prompt includes the user request for all of the plurality of entities.

According to yet other aspects, the user device comprises an automobile or a home device, and the user prompt comprises an audio command.

According to some further aspects, the user input is a privacy preserving gesture provided in the user preferences.

According to yet additional aspects, the user setting is determined based on the user preferences associated with a risk profile of the user, and upcoming or prior user events associated with a user financial condition.

According to additional aspect, the processing the data comprises: receiving data from a plurality of alternate data providers, each of the plurality of data providers having different types of data; standardizing the different types received from the different data providers by performing filtering, de-duplication, normalization, and classification; performing updating and feedback by providing an artificial intelligence system that employs neural networks that use back propagation for periodic updates to a training phase; providing, by a company financial data unit, published information comprising annual reports, press releases, information from the social media of spokespersons or executives, and published pricing information; receiving, by a modelling system, the standardized data and the company financial data, the modelling system including one or more handle generators and forecast builders that are applied to the artificial intelligence-based system that employs the neural networks to generate, as an output, a forecast; receiving the output as the forecast, comprising one or more revenue predictions, to generate a final output as the forecast or the expected value or the recommendation.

According to an alternate aspect, a computer-implemented method of executing an automated user request is provided, the computer-implemented method comprising: receiving, by an online application associated with a user device, user preference information; based on the received user preference information, determining one or more user settings, wherein the one or more user settings is assembled and stored in a database, as a series of preferences, thresholds, or parameters, and in a machine readable form such that it can be accessed and applied to the automated user request, so that the automated user request is executed without user input of the user preferences at a time of the automated user request; processing data to determine a data condition, wherein, to determine the data condition, a plurality of alternate data inputs of different types are processed and normalized, and applied to a series of operations in order to generate a forecast or an expected value or a recommendation having a degree of confidence, and the data condition is compared with third party information; generating an electronic notification indicative of the data condition, wherein the electronic notification includes the data condition compared with the third party information, a confidence indicator associated with the data condition, and a query to perform a single action; in response to an automated determination to perform the single action, the user device generating an automated instruction to execute the automated user request; and based on the automated instruction, executing the automated user request based on the determined one or more user settings that include information on whether the order is executed immediately or at a later time, whether the order is executed as a single transaction or a plurality of transactions, whether, if a plurality of transactions is requested, whether the timing and amount are evenly or unevenly distributed over the course of a time period, whether there are any price limits, or patterns in the case of an uneven distribution of the amount over the course of the time period, and an identity of the one or more brokers or the one or more markets.

BRIEF DESCRIPTION OF THE DRAWINGS

Exemplary implementation(s) of the present invention will be described in detail based on the following figures, wherein:

FIG. 7 illustrates user experiences according to an example implementation of the present application for a watchlist.

FIG. 9 illustrates user experiences according to an example implementation of the present application for a forecast analysis.

FIG. 12 illustrates user experiences according to an example implementation of the present application for an alert chain.

FIGS. 17-21 illustrate various example implementations.

FIGS. 28 and 29 illustrate example user experiences associated with the example implementations disclosed herein.

DETAILED DESCRIPTION

Figure 1:
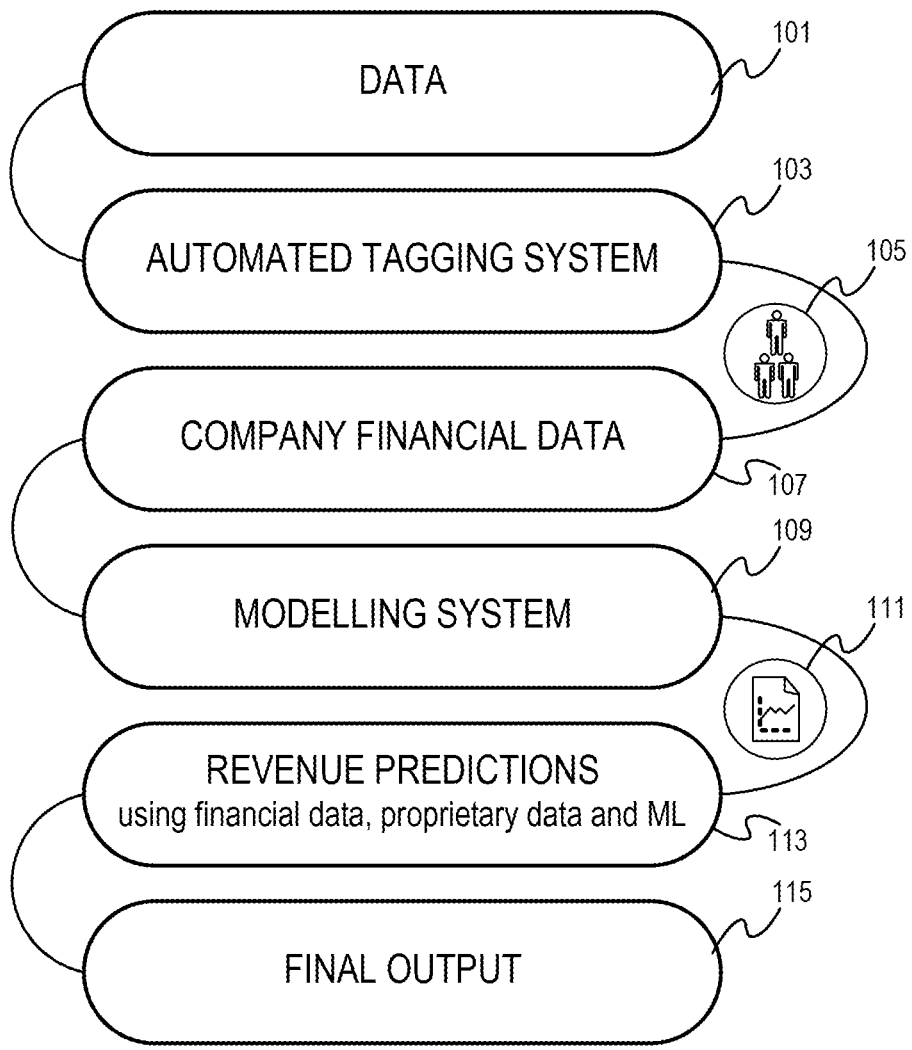
FIG. 1 illustrates functions of an architecture according to an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

With a more complex and dynamic economy, there is a need for accurate data reflecting exactly what is going on in the economy at any given point in time. More specifically, in order to accurately determine the current state of the economy, and to then be able to determine present and future trends in the economy, accurate data is required so that the recommendation itself is accurate.

For example, when considering purchasing a particular stock, a purchaser such as a trader may consider corporate information related to the company associated with the stock. This corporate information may include, at a very high level, how much revenue a company is taking in, how much money the company lost for a particular period of time (e.g., quarter, month, year).

However, this general, broad data is often not an accurate depiction of how a company is actually behaving. For example, revenue for a clothing company may appear to be high overall, but when the data is broken down, the revenue may be coming from online sales primarily. Typically, stores with higher revenue from online sales end up closing several brick and mortar stores, because those stores are no longer profitable. Thus, a trader who is considering to buy that clothing company's stock may not want to purchase that stock if they know that those stores will likely close at a future point in time.

Unfortunately, without accurate data, a trader has little way of knowing how a particular trend will look in the future. Therefore, by collecting data and cleaning and normalizing that data, this cleaned, normalized data may be compared to historical data to deter mine how a particular trend will look in the future. Similarly, a trader may also not be able to assess present information, to make a decision or recommendation. According to the present example implementations, the cleaned, normalized data may be present data that is compared to historical data, to provide an analysis of current trends.

While the above example implementation describes determining trends related to the stock market, other metrics may be determined (e.g., obtained deterministically), including a regional, national, or universal unemployment rate, public and not public company revenues and market shares, consumer behavior across several companies, a basket of stocks (e.g., more than one particular stock such as an entire stock portfolio), electronic indices, restaurant indices, how particular sectors in the workforce are performing, inflation, and trends for mutual funds. In particular, any data or information which may have an economic impact may be measured.

Aspects of the example implementation are directed to apparatuses, methods and systems for receiving a plurality of data inputs from different data providers having different types of data. The different types of data are received in a big data system, which standardizes the data by performing normalization, de-duplication, and classification, and optionally other processes.

The standardized data is provided to a multi panel generator that builds a panel, builds a forecast, and generates a forecast. The forecast is output to an access point, where a user may access the forecast. The user experience may involve receiving the result of the forecast as a recommendation on a watchlist showing multiple entities, a detailed performance and recommendation report for one of the multiple entities, and/or an alert chain that provides the user with an alert that may be triggered by one or more conditions.

In the foregoing example implementation, the data is processed continuously and in real time, such that the user is automatically provided with real-time updates to the recommendations, watchlist and/or alert chain. The user may have the opportunity to execute a transaction, either manually or automatically, as well as to provide real-time feedback on the system.

To implement the foregoing example implementations, an architecture is provided, as explained in greater detail below. Further, the user experience associated with the architecture is also described in greater detail.

Architecture

Figure 2:
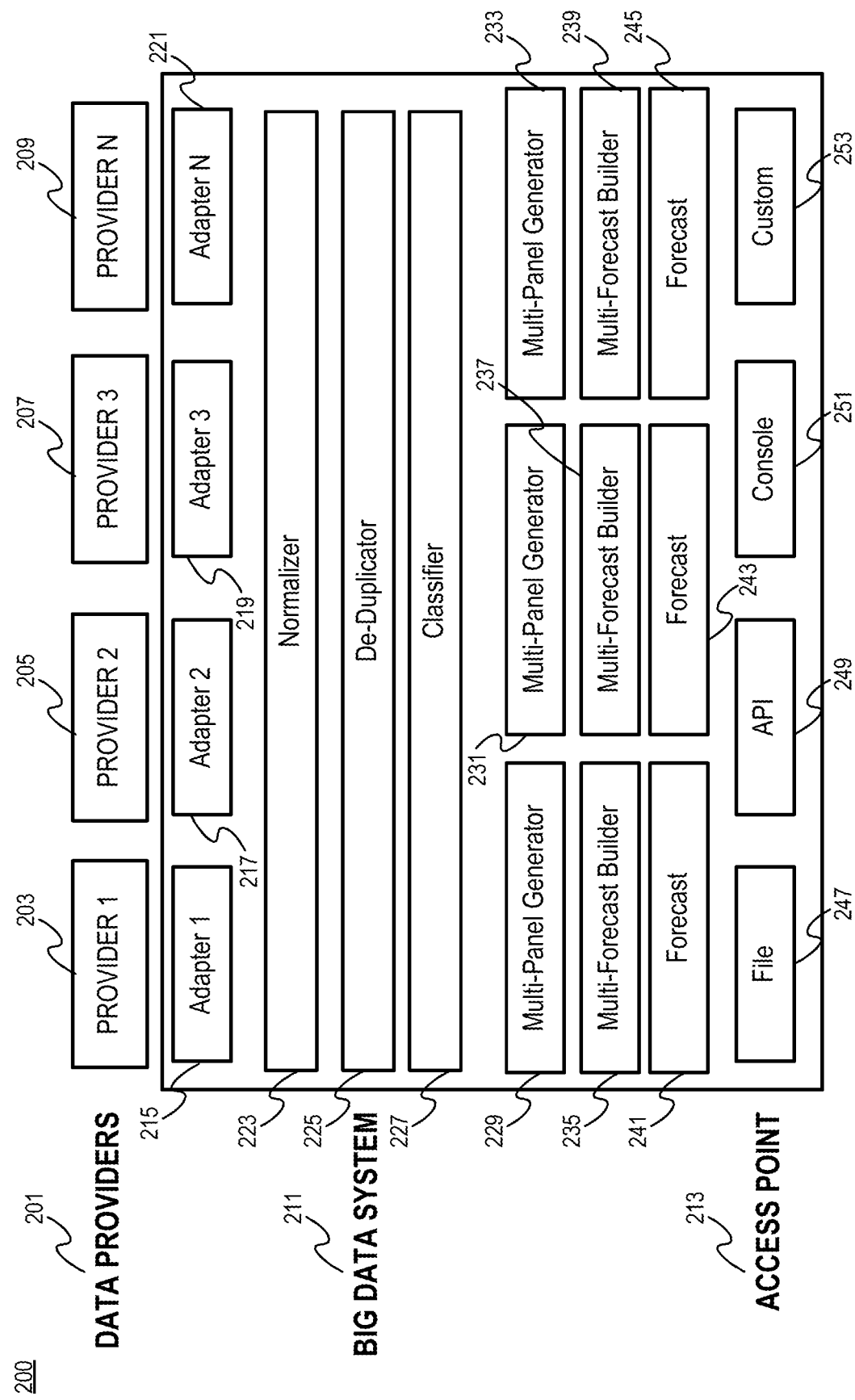
FIG. 2 illustrates a structure of an architecture according to an example implementation of the present application.
Figure 3:
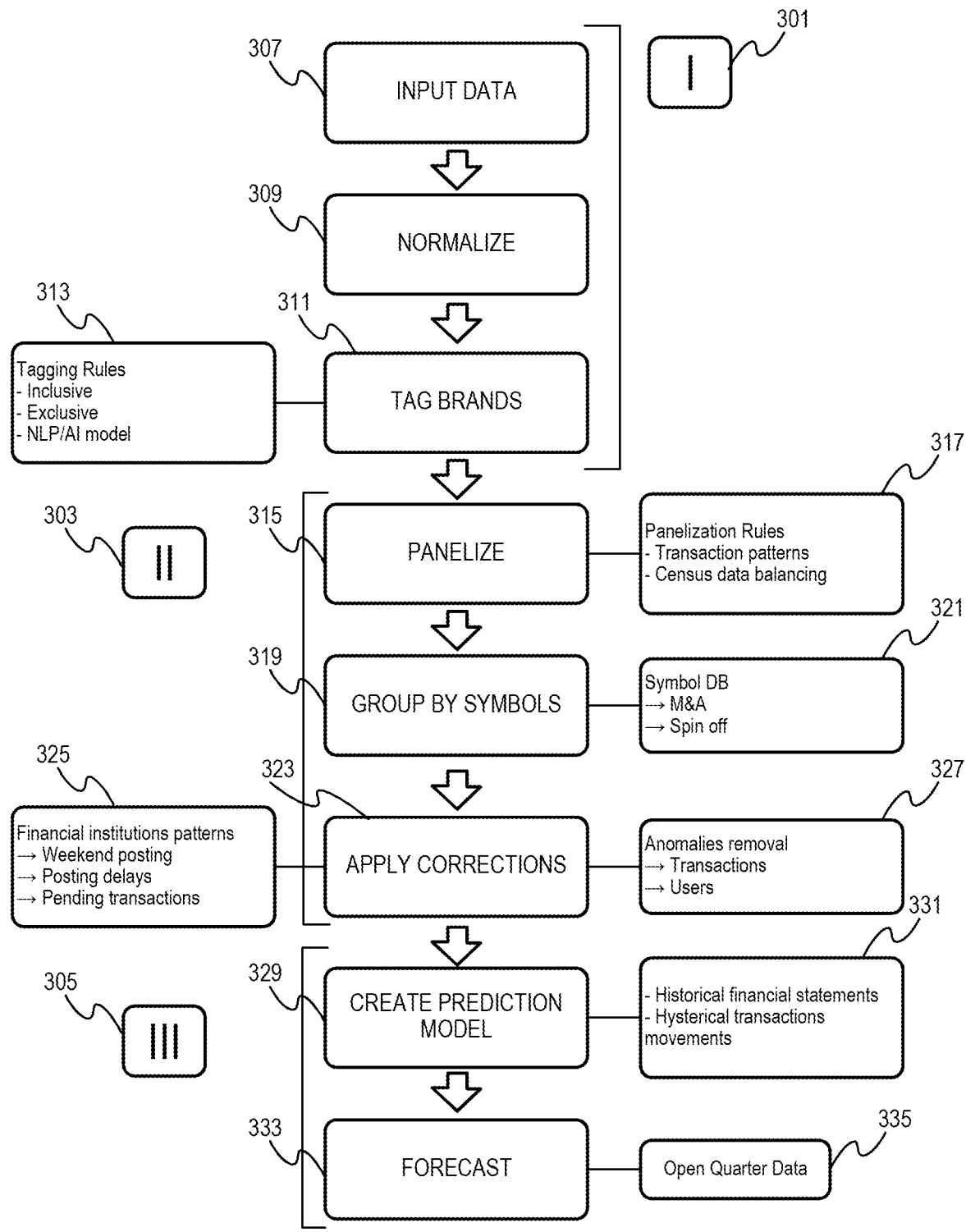
FIG. 3 illustrates a process associated with an architecture according to an example implementation of the present application.

As shown in FIGS. 1-3, for example implementations described herein relate to an architecture, including system elements and associated functions, as well as operations.

FIG. 1 illustrates a schematic description of the architecture according to an example implementation. At 101, data is received from a plurality of alternate data providers. The details of the plurality of alternate data providers will be described below in greater detail. For example, but not by way of limitation, some of the data providers may include financial transaction information providers, location information such as GPS data, consumer behavior information such as social media or online publication information, or other data.

At 103, an automated tagging system is provided that receives the data from the plurality of data providers, and performs tagging, or labeling of the data. More specifically, the data may be standardized across the different types of data that were received from the different data providers. The standardization processes may include, but are not limited to, filtering, de-duplication, normalization, and classification or labeling. Further details of the automated tagging system are provided.

At 105, and updating and feedback process is provided. More specifically, manual or automatic processes may be provided for the automatic tagging system to be updated, and for checking and auditing of the process. Optionally, the input to the updating and supervising process may be provided to a manual source, such as a data miner or an analyst. Alternatively, in some example implementations an artificial intelligence system that employs machine learning, such as neural networks, may use back propagation techniques for periodic updates to the training phase.

At 107, financial data associated with a company is provided. More specifically, published information such as annual reports, press releases, information from the social media of spokespersons or executives, published pricing information, and other information as would be understood by those skilled in the art is provided.

At 109, the standardized data of the automated tagging system 103 and the company financial data 107 are provided to a modeling system 109. The modeling system 109 includes one or more handle generators and forecast builders, which are applied to a model. The model may include, but is not limited to an artificial intelligence-based system that applies machine learning, in the form of neural networks, to receive the standardized data of the automated tagging system 103 and the company financial data 107, apply them to the neural network, and generate, as an output, a forecast.

And as noted at 111, an input to the modeling system may include, but is not limited to, proprietary data associated with the merger and acquisition information of the company, and the fiscal quarters calendar of the company.

At 113, an output of the forecast is provided as one or more revenue predictions. As explained above, the company financial data that is based on the standardized data, as well as the proprietary data, is fed into the machine learning model to generate the revenue predictions.

At 115, a final output is provided in the form of a recommendation. For example, but not by way of limitation, the final output may be a recommendation to buy, hold or sell, as a transaction. Alternatively the final output may be a score. Still alternatively, the final output may be the execution of the transaction itself, without involving the user. Optionally, a rule-based or other deterministic approach may be employed, in combination with the probabilistic approach of the machine learning, as disclosed above.

FIG. 2 illustrates an architecture 200 according to the example implementations. Inputs 201 include data providers 201-207 provided to a big data system 211, which is in turn associated with an access point 213.

More specifically, as shown in 200, data is received as inputs 201 from a plurality of N data providers 203-207. Where the term "data source" is used herein, the data is acquired from one or more data provider, such as N data providers 203-209, as well as any other data providers as would be understood by those skilled in the art.

In the big data system 209, for each of the data providers 203-209, N corresponding adapters 215-221 are is provided. The adapters 215-221 may normalize 223, deduplicate 225 and classify 227 the data, as described herein.

As explained above, data is provided by the data providers 203-209, and processed by the data adapters 215-221. The output of the data adapters 215-221 is provided to an automatic tagging system, such that resulting output data has been normalized, de-duplicated and classified, as disclosed above. These aspects of the example implementations are automated; however, data miners and analysts may optionally supervise the process, and continue to update the process. The resulting output data may be combined with company financial data, such as financial reports or other publicly available information associated with characteristics of the company, either historical or present.

An output of the automatic tagging system and the company financial data is provided to a modeling system. The modeling system may include plural multi-panel generators 229, 231, 233, multi-forecast builders 235, 237, 239, and forecast modules 241, 243, 245. The modeling system generates, as its output forecast, a revenue prediction, based on financial data, proprietary data and machine learning. More specifically, the financial data and proprietary data includes the above described inputs of the automated tagging system and the company financial data. For example but not by way of limitation, the data may include financial reports, merger and acquisition information, and quarterly fiscal performance.

The output is the forecast, which may be provided in the format of a file, an API, a console or a custom format to the output. Accordingly, the output is provided to a user at the user access point. Example user experiences associated with the access point are described in greater detail herein.

FIG. 3 illustrates a process 300 associated with the foregoing structures and functions according to the example implementations. More specifically, the process is divided into a first phase 301 associated with data processing, a second phase 303 associated with development of the panel and calibration, and a third phase 305, associated with creating and applying a prediction model, and generating a forecast.

With respect to the first phase 301, at 307 input data is received. As noted above, and as explained herein, the input data is from a plurality of sources of different types. For example but not by way of limitation, the input data may include timeseries data from multiple vendors, such as credit card transactions, debit card transactions or other electronic purchase transactions.

At 309, the data is normalized. More specifically, the input data of operation 307 is mapped from the organic vendor data format in which it was received, to an internal data format that provides consistency across vendors. For example but not by way of limitation, the normalization involves accounting for the differences in the different alternate data sets, and standardizing that data to a common standard. Additional aspects may include the duplication or other processes to standardize the data.

At 311, brands associated with purchases are tagged. The tagging may involve the application of tagging rules on the normalized data. The rules may include, but are not limited to, rules that are specific to a credit card or debit card, geo-fencing rules for UPS data, rules associated with browser history or online application usage, or other rules as would be understood by those skilled in the art. For example, but not by way of limitation, for a series of financial transactions, each of the financial transactions may be labeled, or tagged. To perform the tagging, one or more tagging rules 313 may be applied. The tagging rules may be considered to be an inclusive filter, or an exclusive filter. Further, in addition to a rule-based approach such as a filter, a natural language processing approach may be taken that incorporates artificial intelligence, such as machine learning models that involve neural networks.

Once the input data has been normalized and tagged, at the second phase 303, a panelization operation 315 is performed. According to the example implementations, a sample of users is established as a panel. The users are chosen to match criteria associated with the panel. For example, but not by way of limitation, the panel may be created in a manner that is associated with the input data churn rate. Other examples of channelization rules are shown at 317, and those rules may be based on user transaction patterns, census data balancing, or other rules that associate a characteristic of user transaction behavior with a transaction.

Once the panels have been generated at 315, a grouping process is performed at 319. More specifically, the panels are grouped by symbol. Brands associated with the data in the tagging process are assigned to symbols associated with a company. It is noted that this data may change over time, due to mergers, acquisitions, spinoffs, bankruptcies, rebranding, listing, delisting or other financial events. Thus, the events are assigned in real time to be included at the time of assigning the brand to the symbol at 319. The symbol may be chosen from a database, such as those shown at 321.

At 323, one or more corrections are applied to the grouped. For example but not by way of limitation, as shown in 325, patterns that are specifically associated with a financial institution are applied to calibrate the grouping. Examples of such patterns may include weekend postings of information, posting delays typically associated with a financial institution, as well as pending but not yet posted transactions. Additionally, as shown at 327, anomalies are removed. Examples of anomalies that are removed may include, but are not limited to anomalous transactions or anomalous users.

Once the panels have been fully generated in the second phase 303, the process proceeds to the third phase 305 as follows. At 329 a prediction model is generated. For example but not by way of limitation, in the training phase, historical data associated with a company, such as the fundamentals of the company and the stock price, as well as historical measurements that may have been previously were historically provided by the example implementations, are used as training data. Accordingly, the prediction model is trained based on this training data, as shown at 331.

At 333, a forecast is generated. Using the prediction model generated at 329, features associated with the open quarter 335 are applied, to derive a prediction of future stock price for future company fundamental metric. While the features are disclosed as being directed to an open quarter, example implement patients are not limited thereto, and other open periods may be substituted therefor.

The foregoing example implementations of the architecture may be run on the hardware as explained below with respect to FIGS. 26 and 27. Further, the hardware provides for continuous large-scale data inputs, such that the model is continuously receiving data and be updated automatically and in real-time. Thus, the processing capability of the hardware must be sufficient to permit such processing. For example but not by way of limitation, a GPU may be used for the artificial intelligence processing. Alternatively, or in combination with the GPU (graphical processing unit), an NPU (neural processing unit) may be used. One or both of these units may be used in a processor that is located remotely, such as a distributed server system, for a cloud computing system.

For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources.

Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction.

Further, an API is provided for data access. For example but not by way of limitation, the REST API, which conforms to a REST style architecture and allows fir interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Alternative Datasets

Figure 4:
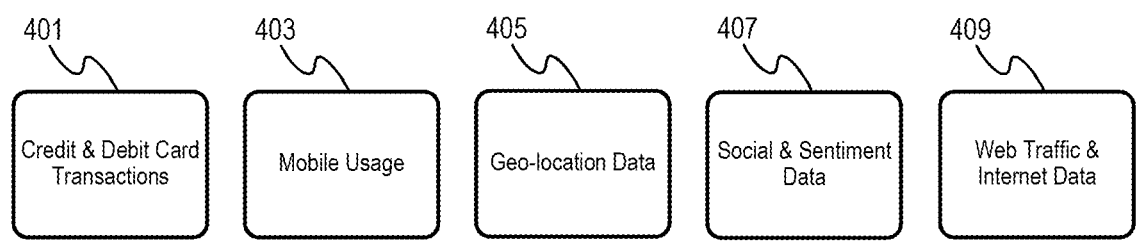
FIG. 4 illustrates example alternative data types according to an example implementation of the present application.

As explained above, the architecture is configured to receive a plurality of alternative data sets. As shown in FIG. 4, examples of the alternative data inputs 400, may include, but are not limited to, credit card transactions and debit card transactions for one, mobile device usage information 403, geolocation data 405, social data and sentiment data 407, and web traffic and Internet data 409.

The above-disclosed hardware implementations may be used to process the alternative datasets of FIG. 4, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Figure 5:
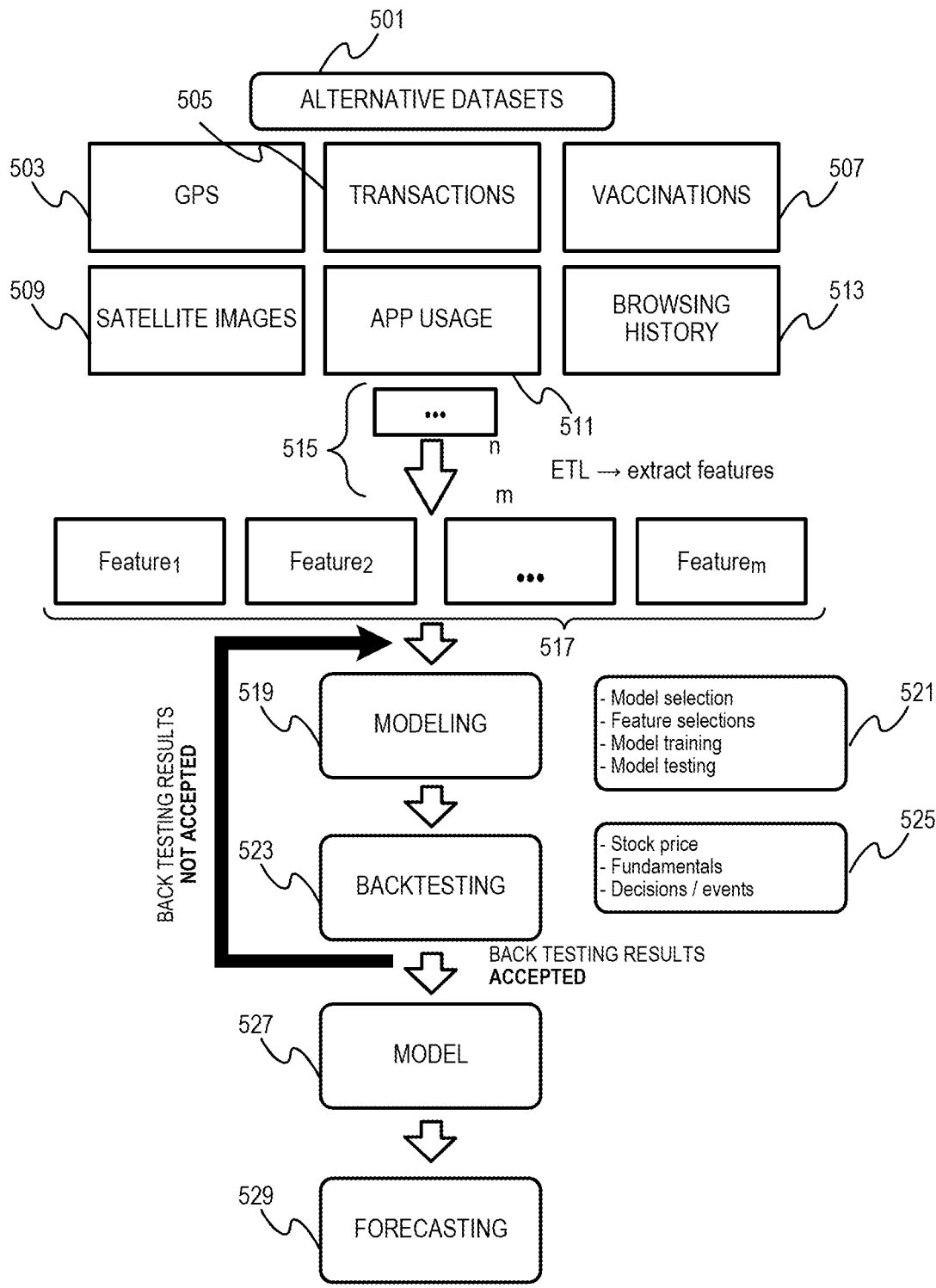
FIG. 5 illustrates example alternative dataset processing according to an example implementation of the present application.

FIG. 5 illustrates the processing of the alternative data sets according to the example implementations. More specifically, at 500, the receiving and processing of the alternative data sets is disclosed. The alternative data sets 501, may include, but are not limited to, data having alternative types. For example but not by way of limitation, GPS data 503, data associated with financial transactions 505, vaccination data 507, satellite image data 509, app usage data 511, and browsing history information 513 are all types of data that might be a part of the alternative data sets 501. However, the alternative data sets 501 are not limited to the foregoing example patients, and other data sets may also be included as would be understood by those skilled in the art.

At 515, the multiple sources of data have an ETL (extract, transform load) operation performed, to extract, transform and load the data. Accordingly, the features associated with the data types one through m at 515 are extracted into corresponding features one through m as shown at 517.

At 519, the process is subjected to a modeling operation. The modeling operation includes, as shown at 521, selection of the model, selection of the features, performing the training phase on the model, and performing model testing. The modeling operation 519 may be performed on an artificial intelligence system that uses neural networks and machine learning.

At 523, a validation step is performed, also known as backtesting. For example, the historical data associated with stock prices, company fundamentals, and historical decision or events, as disclosed at 525, are applied to the model that was generated. A determination is made, based on the validation of 523, whether the application of the historical information successfully validates the model. If the model was not successfully validated, or in other words the backtesting results were not found to be acceptable, the process returns to 519, and the modeling is again performed.

On the other hand, if the validation at operation 523 was successful, the operation proceeds. More specifically the operation proceeds to the modeling operation 527 and the forecasting operation 529, as discussed above.

The above-disclosed hardware implementations may be used to process the alternative datasets of FIG. 5, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Automatic Tagging

Figure 6:
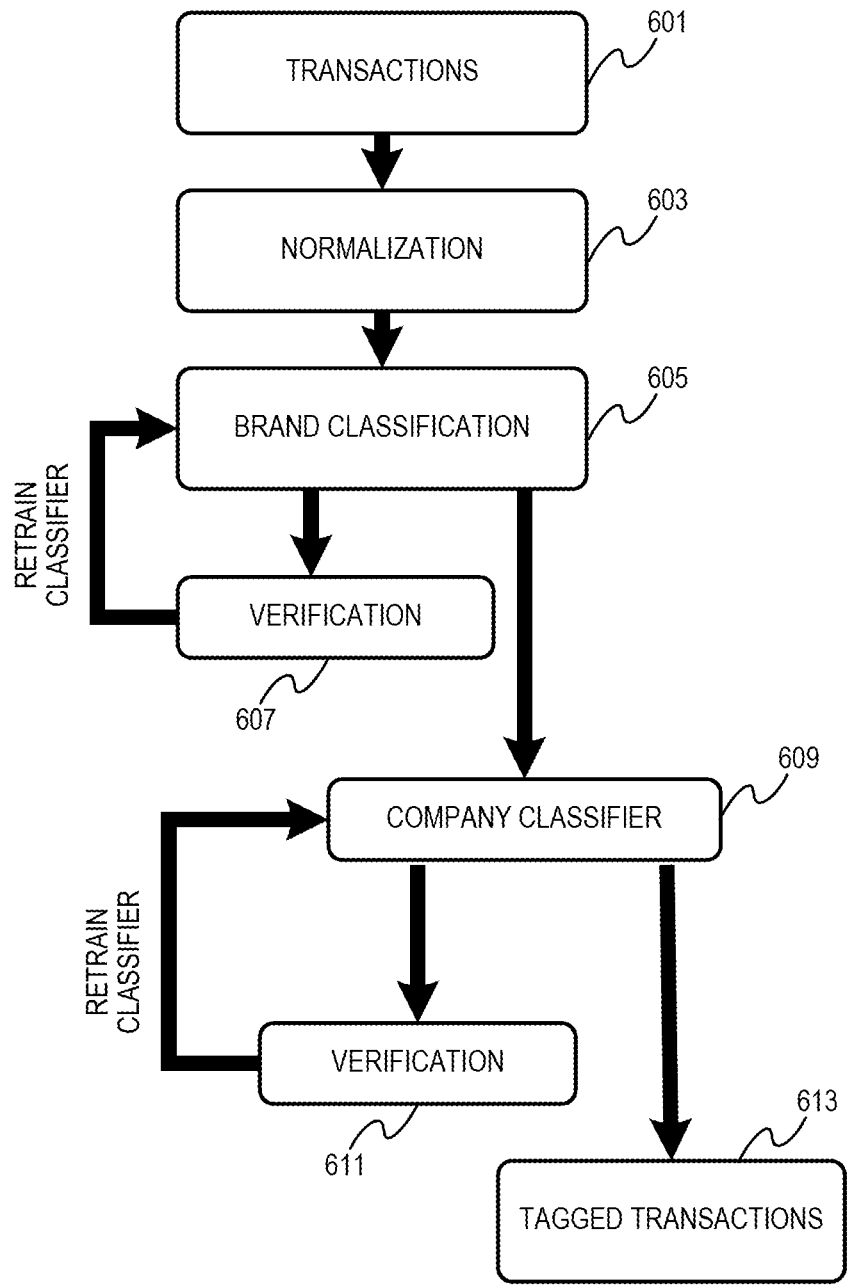
FIG. 6 illustrates example automatic tagging according to an example implementation of the present application.

As the alternative data sets have been processed as explained above, and with respect to operation 101, automatic tagging 101 is performed on the data. FIG. 6 illustrates automatic tagging 600 in accordance with the example implementations.

At 601, the transactions are received and the alternate data sets are processed as explained above. At 603, normalization is performed. More specifically, features are extracted from the transactions that are relevant for the brand classifier.

At 605, brand classification is performed. More specifically, the extracted features of the normalization 603 are applied to a classification layered model. More specifically, a rule-based approach is applied that performs the extraction in a deterministic manner, and the rule based approach is mixed with an artificial intelligence approach, such as machine learning based on neural networks, that is probabilistic in nature. Accordingly, the brand classification 605 is performed in a mixed deterministic and probabilistic model.

At 607 a verification step is performed to verify that the classifier is accurate. More specifically, a sample of the classified data is verified, to confirm that the labeling was correctly applied with respect to the brand. If necessary, the classifier is retrained. Optionally, this verification and retraining operation at 607 may be performed iteratively, until the brand classification has been verified to a threshold confidence level.

At 609, the brands are classified with respect to companies. For example, the companies may be private companies, publicly, or other traded companies organizations having similar features to public or private companies. In a manner that is similar to operation 605 and 607 above, a mixture of rule-based, deterministic operations and probabilistic, artificial intelligence operations such as machine learning and neural networks, are employed so that the brands are classified to companies. Also similar to operation 607, at 611, the company classifier is verified to ensure that sampled data has been accurately labeled with respect to the classification of the company. If necessary retraining, and optionally iterative free training, may be performed until the company classification has been verified to a threshold confidence level.

At 613, once the brand classification 605 and the company classification 609 have been verified, the tagged transaction is considered to have been generated at 613. For example but not by way of limitation, the labeling is performed in a manner such that the data has been automatically labeled. An output of this process may be used in the panel generation, forecast building, and forecast.

The example implementations may have various advantages and benefits over the related art approaches. For example, but not by way of limitation, the related art approaches may suffer from problems or disadvantages, such as incorrect tagging of names that are common (e.g., DENNYS or SPRINT), names that are short (e.g., AMC or BOOT), names that are specific (e.g., TACO or TARGET), and names that are similar (e.g., FIVE BELOW or BIG FIVE). Further, entities may be omitted if they do not follow a clear standard. Examples of the lack of use of a clear standard resulting in company omissions includes the use of abbreviations instead of the full name, a change in the name over time, slight difference in names due a difference of timing of the acquisition of the store, or typographical errors in the name of the store. Other examples of related art errors include the assignment of the transactions to the wrong ticker (company indicia), even if the transactions clearly are associated with a different company.

The above-disclosed hardware implementations may be used to process the automatic tagging of FIG. 6, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

User Experience

The outputs of the example implementations described herein may be provided in a user experience, in a manner that provides for the user to visualize information generated by the architecture. While the foregoing example implementations may be executed in the cloud as explained above, the user may be provided with an online application that permits the user to access a user interface associated with an output of the foregoing example implementations. That user interface may be, but is not limited to, an online application on a mobile device, an application on a laptop, and interactive application on a home device such as Amazon Alexa, and application in a mobile setting such as an automobile that is executed by the processor of the automobile, or other manner or structure of executing computer readable instructions for providing the user experiences described herein.

For example but not by way of limitation, a user may be provided with a watchlist that is generated to provide the user with decision-support information associated with the outputs of the architecture, such as a prediction, forecast, recommendation or the like. Additionally, detailed analysis of an entry on the watchlist may be provided, along with a specific recommendation, and detailed metrics regarding the basis of the recommendation, and optionally compared with a recommendation provided by an external benchmark. Further, the example implementations described herein may be used to provide a chain of alerts, or optionally, a decision support or automated decision tool, which combines a deterministic rules-based approach with the above described aspects, including but not limited to the art of artificial intelligence approaches.

Data processing associated with user experiences may be processed using the hardware disclosed herein. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Watchlist

FIG. 7 illustrates a user experience associated with the example implementations. As shown at 700 the user experience provides a watchlist of companies, which may be selected by a user, for example, or suggested to the user based on preferences associated with the user. For example, but not by way of limitation, the watch list includes in a first column 701 a name of the company, including the company name and trading symbol. In another column 703, a stock price is provided, along with information on the performance, such as change in share price as total amount and percentage.

In yet another column 705, a type of critical data associated with the performance that is being used as an input in the example implementations is identified. As shown in FIG. 7, the first row is associated with a first company, which may be a large retail company having physical and online presence for retail sales, for which the revenues is a critical indicator of performance. For the second row, which is an online subscription company, a number of other users associated with the product is a critical indicator of performance. For a third row, which is a retail restaurant that users may visit, same-store visits is provided as a critical indicator of performance. For a fourth row, which is a large automotive manufacturer, with international presence, US revenues is provided as a critical indicator of performance. For the fifth row, which is a social media company engagement of users (e.g., time spent on the platform) is provided as a critical indicator of performance.

In still another column 707, a performance associated with the critical indicator of performance is shown. As shown in FIG. 7, for the first row the critical indicator of revenues are showing a performance increase of 0.4%; for the second row the number of users is showing an increase of 3%; for the third row, same-store sales is showing a decrease of 10%; or the fourth column, the US revenues are showing an increase of 6.2%; and for the last row, user engagement is showing an increase of 3%. Accordingly, the example user experience provides a user with information on a critical indicator of performance, as well as the actual performance based on the input data as explained above.

According to the present example implementations, based on the critical indicator and the performance, the system generates a score in yet another column 709. The score provides an indication for the user of the performance of the company, which the user can apply as a form of a recommendation. For example, but not by way of limitation, in the case of the first row in FIG. 7, a growth of 0.4% revenue is associated with a score of neutral, whereas in the second row, an increase in the number of users of 3% is associated with over performing. In the third row, a 10% decrease in same store sales is associated with an underperforming score. In the fourth row, an increase of 6.2% in US revenues is associated with an over performing score. In the last row, an increase of 3% engagement is associated with an over performing score.

Accordingly, the user experience according to the example implementations provides the user with information on the critical indicator of performance, which is determined by the system based on the type of company and the available data among the plurality of the data streams. Further, the actual performance of the critical indicator for each of the companies is provided, along with a determination of the score. For example, but not by way of limitation, the information of the first row, such as revenue information may be generated based on the input credit card information that is received as a data source, as explained elsewhere in this disclosure. That information may be used to determine a revenue associated with the company, and may be used to calculate the performance.

While the score shown in the drawings is a single word, such as neutral, over performing or underperforming, other scores may be substituted without departing from the inventive scope. For example, but not by way of limitation, a numerical score, such as a performance rating from 1 to 10, may be provided. This information and score is generated based on the input data that is provided, as well as observations of what is characterized as an appropriate score relative to that company. Thus, each company may have a different score deter ruination based on company attributes such as industry or company size, to determine the amount of variation in performance that is necessary to provide the score.

The example implementations described herein provide a method of determining a critical indicator, as shown in the watchlist. For example, but not by way of limitation, historical data may be applied in an artificial intelligence machine learning model in order to determine the criteria having the highest correlation with respect to a change in the stock price. For example, but not by way of limitation, some related art approaches may attempt to directly measure a grossed number of users in order to determine revenue. However, such related our approaches can be accurate, because a doubling of the number of users does not necessarily correlate to a doubling of the amount of revenue. The reason this may be true is because the new users may not have the same representation, use pattern or consumer preferences as the initial or earlier users.

Similarly, the geographical location of use, users or other information is crucial to determining whether the data is representative of the users, and can correctly determine the critical indicator. As explained above with respect to the example implementations, GPS data is received as an input, and is also stabilized in the automated tagging system, so that the data can be representative. As another example, the data must be stabilized not just to show the overall number of users, but to show the amount of time that a user spends in an online app, because if the new user spends more time or less time in the app than the current users, this may be reflective of a different user behavior with respect to revenue, purchase, advertisements or the like, and can make the data more accurate.

In a similar manner, when a company acquires a target, the number of users may increase, although those new users may not be representative of the earlier users. During the time between the announcement of the merger and the completion of the merger process, several months or years may pass, during which publicly available information may be incorporated into these example implementations and thus adjust the critical indicator, performance indications, and or recommendations to calibrate for such information. Legal or regulatory blockages, such as antitrust or export control, may stall or block the merger, such that the presence of certain terms in publicly available information associated with the merger can be used to adjust the forecasting and recommendation. Further, the predictive aspect of the tool may provide a forecast for performance after the merger, based on similar patterns that were used to train the model as to how to characterize, process and generate an output prediction for such models.

As another example, for a stock associated with the restaurant, the change in pandemic status of the coronavirus from a more severe situation to a less severe situation may influence consumer preference to return to in person dining. The inclusion of such information may be more sensitive for certain industries or companies. In the case of coronavirus, the industries of travel, leisure, dining or others may be more sensitive as compared with other industries; the present example implementations are capable of performing data stabilization to account for such changes. Without the foregoing approaches of the example implementation which performed normalization, the duplication, classification and data stabilization, the data lacks the necessary accuracy to determine the critical indicator with a sufficiently high degree of confidence (e.g., clustering to better represent the user population).

Figure 8:
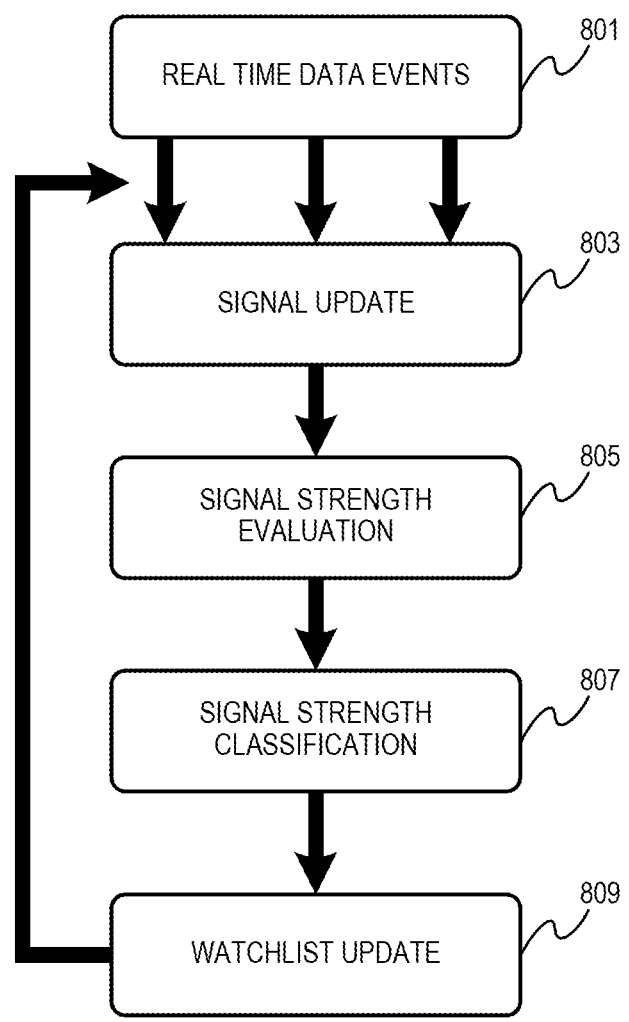
FIG. 8 illustrates processes associated with generation of the user experiences according to an example implementation of the present application for the watchlist.

FIG. 8 illustrates a process for generating and updating information to the watch list, in accordance with the example implementations. As it relates to the user experience described above, the type of critical indicator as well as the score are continuously updated based on data inputs, on a real-time basis. For example, in the first row revenue is listed as a critical indicator type. However, if there are changes in the incoming data associated with the company, the example implementations may change the type of critical indicator from revenue to another critical indicator, such as same-store sales, customer base, or other critical indicator.

More specifically, as shown at 800, inputs are provided into the architecture described herein. For example, but not by way of limitation, there is a separate pipeline for each type of signal associated with a critical indicator, for each company. Thus, in the above described example, for the first company, there may be multiple pipelines for each of the candidate critical indicators. One pipeline may be associated with the signal for the revenues, and another may be associated with consumer spending, or indicators of company performance.

More specifically, at 801 real-time data events from alternative data sources, as explained above are provided. Each of the pipelines is triggered by receiving new data that is relevant to the model. The input of new data from alternate data sources is described as explained above. These real-time data events are processed according to the example implementations with respect to the architecture to generate a signal based on the current data. Thus, an updated signal is provided at 803. More specifically, the new data that was received at 801 is provided to the model of the example implementations. Accordingly, a prediction is generated as described above, and is provided as an output signal.

At 805, a strength of the updated signal is evaluated. For example but not by way of limitation, the output signal, which may be a prediction of the potential critical indicator, is compared with benchmark consensus signals. According to one example implementation, the updated signal may be a predicted revenue for a company, which is compared with a prediction generated by one or more analysts, or an analyst consensus, from available information. Based on the comparison between the updated signal and the benchmark signal, a signal strength vector is generated, which is indicative of a relative degree of closeness between the updated signal and the benchmark signal.

At 807, the strength of the updated signal is classified. More specifically, the signal strength vector generated at 805 is classified into a recommendation. For example but not by way of limitation, the recommendation may be a one-dimensional actionable recommendation, such as hold, buy or sell.

At 809, the classification associated with the strength of signal is used to generate any updates, which are subsequently provided and displayed to the user in the user experience. More specifically, the user interface, such as the web interface, a mobile interface, or a pushed alert may be updated with the results of the signal strength classification, as well as the watchlist update. Thus, according to an example implementation, the user may be provided with a change in the critical indicator type, as well as a change in the recommendation, depending on which of the pipelines has the strongest vector. Optionally, plural pipelines may be blended or weighted based on the signal strength, to provide the blended result, with the critical indicator being listed as the most heavily weighted indicator. According to another example implementation, plural indicators may all be listed, along with plural outputs of the results, followed by a recommendation based on a matrix operation or multiplexing of the strength vector, weighted or unweighted, associated with each of the pipelines for each of the signals for each of the companies.

According to this example implementation, the user may be provided with real-time changes in critical indicator, performance and recommendation that are actionable. As explained below, the recommendations may also be provided in the detailed analysis of a company, or a chain of alerts and may be used for the recommendation or actual action automatically being taken.

The above-disclosed hardware implementations may be used to process the watchlist of FIGS. 7-8, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Performance and Recommendation

As shown in FIG. 9, according to another example user experience 900, any of the companies shown in the foregoing user experience of FIG. 7 may be selected for providing a further summary. Here, the fourth row is selected, and further information associated with the forecast is provided. A recommendation 905 is provided, in this case "strong buy" based on a decrease in the revenue.

Further details 903 are provided to the user, such as the relative impact of revenue on the stock price (e.g., correlation between revenue and stock price), and the prediction accuracy for the stock associated with the example implementations. Information on the forecast based on the analyst expectation is provided, in comparison to the forecast based on the real data measurement, as well as the score associated with the performance that is based on the real data measurement. Charts 907 are provided showing a comparison of the revenue based on real data measurement, as compared with the expected revenues, which may be based on published information that was provided by the company. Additionally, information of the stock prices also provided.

Figure 10:
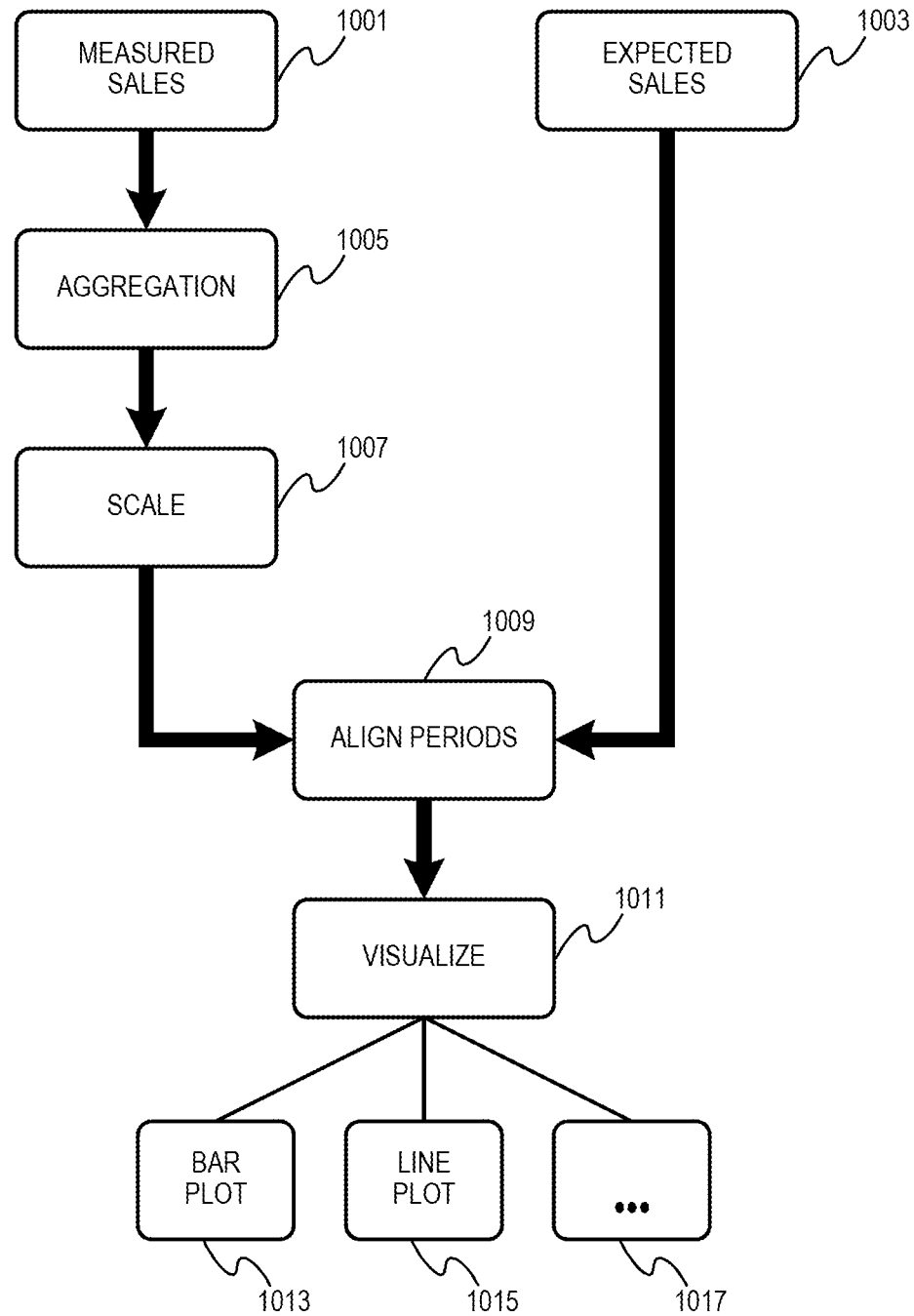
FIG. 10 illustrates processes associated with generation of the user experiences according to an example implementation of the present application for the forecast analysis.

FIG. 10 illustrates a process 1000 for generating an output that visualizes a difference between expected values and actual values according to the example implementations.

At 1001, measured sales are provided. First applicable not by way of limitation, as disclosed above, the measure sale may include company sale that are calculated, such as in the second phase 303 as shown in FIG. 3, and disclosed above.

At 1003, expected sales are provided. The expected sales may be based on analyst prediction, analyst consensus, industry publication, or other available information associated with the providing of expected sales information, as opposed to actual sales information.

At 1005, for the measured sales obtained at 1001, and aggregation operation is performed. More specifically, the measured sales are aggregated based on time series into intervals that are comparable with interval associated with the expected sales signal. For example but not by way of limitation, if the expected sales signal has a known time interval such as daily, weekly, hourly, quarterly, etc., the measured sales are aggregated into comparable time periods.

At 1007, a scaling operation is performed. More specifically, because the measured sales provide information from a sample of the population, the measured sales need to be scaled. For example but not by way of limit deletion, the scaling may involve extrapolating a sample representative population associated with the sample, and similarly to extrapolation of the aggregated sales of that population of the sample to the representative population.

At 1009, the periods associated with the scaled, aggregated information of measured sales from 1001, 1005 and 1007 are aligned with the period of the expected sales of 1003. Accordingly, the aggregated, scale measured sales are joined with the expected sales, by time interval.

At 1011, a visualization operation is performed. Accordingly, an output may be provided to a user in the form of a bar plot 1013, a line plot 1015 or any other visualization technique 1017th as would be understood by those skilled in the art. Visualization techniques are not limited to a single approach, and different visualization techniques may be combined, appended, mixed or blended. Further, instead a graphic visualization approach, a text output may be provided in the form of a narrative chart that simply displays the result.

Figure 11:
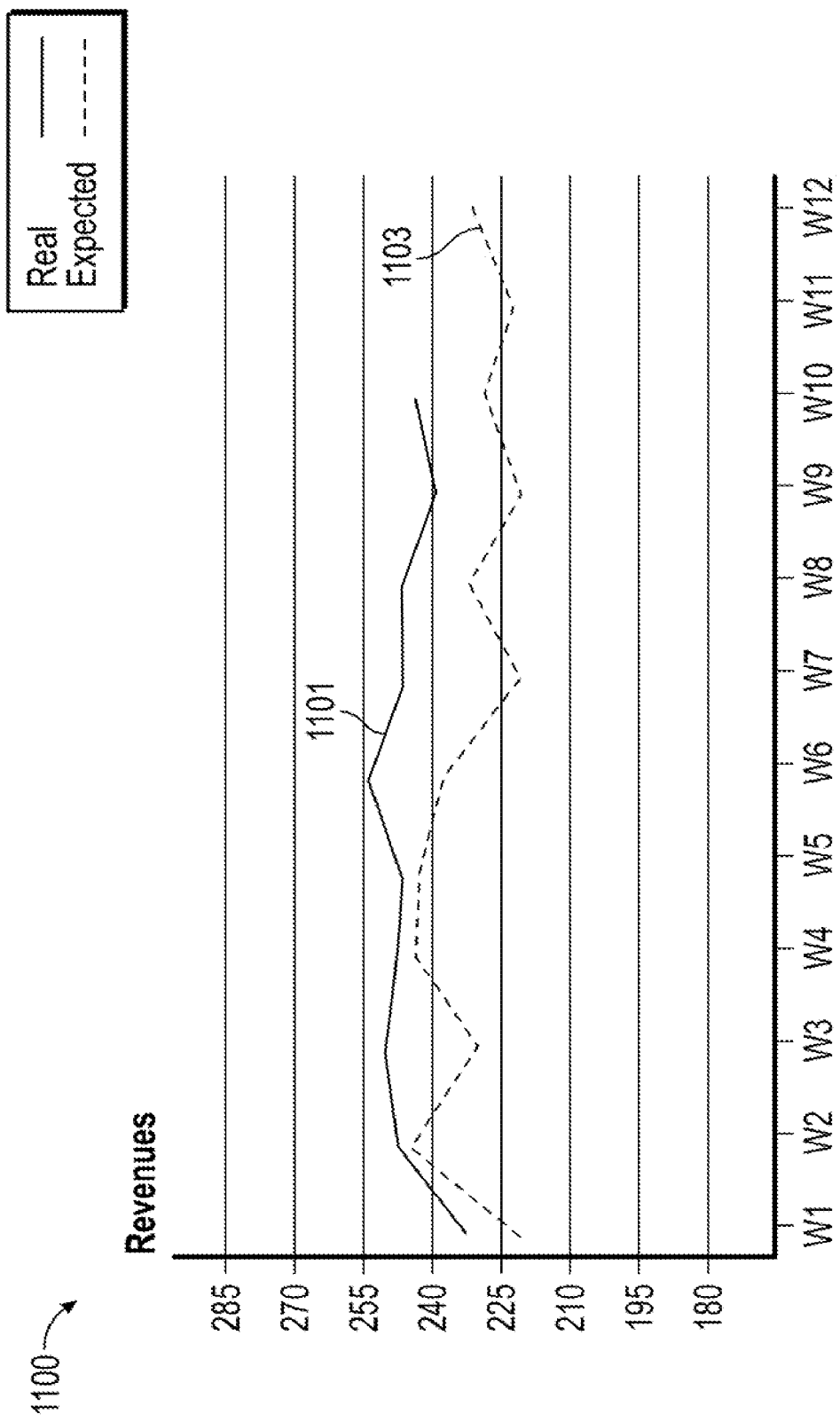
FIG. 11 illustrates user experiences according to an example implementation of the present application for the forecast analysis.

FIG. 11 illustrates an example graphical visualization associated with the example implantations described above. More specifically, at 1100, a chart is provided that displays sales revenue on a weekly basis over a 12 week period. At 1101, the aggregated information of the measured sales, which has been aligned to a weekly period, is displayed. Additionally, at 1103, the expected sales, provided on a weekly interval, is displayed. Accordingly, a user may be provided with a display that illustrates a difference between the measured sales as associated with the example implementations herein, and the expected sales, as provided by analysts, analyst consensus, etc.

Returning to FIG. 9, the charts 907 include a revenue comparison. Thus, the user can visualize, and understand by looking at the detail information and 903, that the measured revenue is about 6.2% higher than the forecast based on the expectation by the analysts. Thus, the example implementations provide a determination that the entity is over performing as compared with the analyst expectation. As a result, the example implementations generate a recommendation of "strong buy" at 905, in the manner explained above.

The above-disclosed hardware implementations may be used to process the evaluation and recommendation operations associated with FIGS. 9-10, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Alert Chain

As shown in FIG. 12, according to yet another user experience associated 1200 with the example implementation, alerts are provided to the user. The selected alerts are listed in rows, divided into the alerts specific to the user 1201 and an aggregated list of the most popular alerts 1213 across all of the users. As previously disclosed, a column is provided for the name and stock symbol of the company, as well as the type 1203 of information that is the basis for the alert, the condition 1205 that triggers the alert, and the frequency 1207 of the alert to be provided. The user is provided with a tool 1209 to set the alert to active or inactive, to a tool 1211 to edit the alert, and to delete the alert.

For example but not by way of limitation, as shown in the first row, the alert may be based on the performance being greater than 5%. As shown in the second row, plural alerts are provided to be associated with a single company, in this case the price moving above 5% and the score having a value of "over performing". Similarly, a time-based alert may be provided, such as the user being provided at an alert 10 days before an earning call, as shown with respect to the third row. Accordingly, the user is provided with a chain of alerts that may be triggered by one or more conditions associated with a company.

As also shown in FIG. 12, users may be able to view the most popular alerts 1213 that are being generated across the user base, as well as the number of users 1215 that are generating and using those alerts. Detailed information such as type, condition and frequency each of those popular alerts is provided. The user is provided with an option to add those alerts to their own user alert chain as shown by the "+" symbol 1217.

Figure 13:
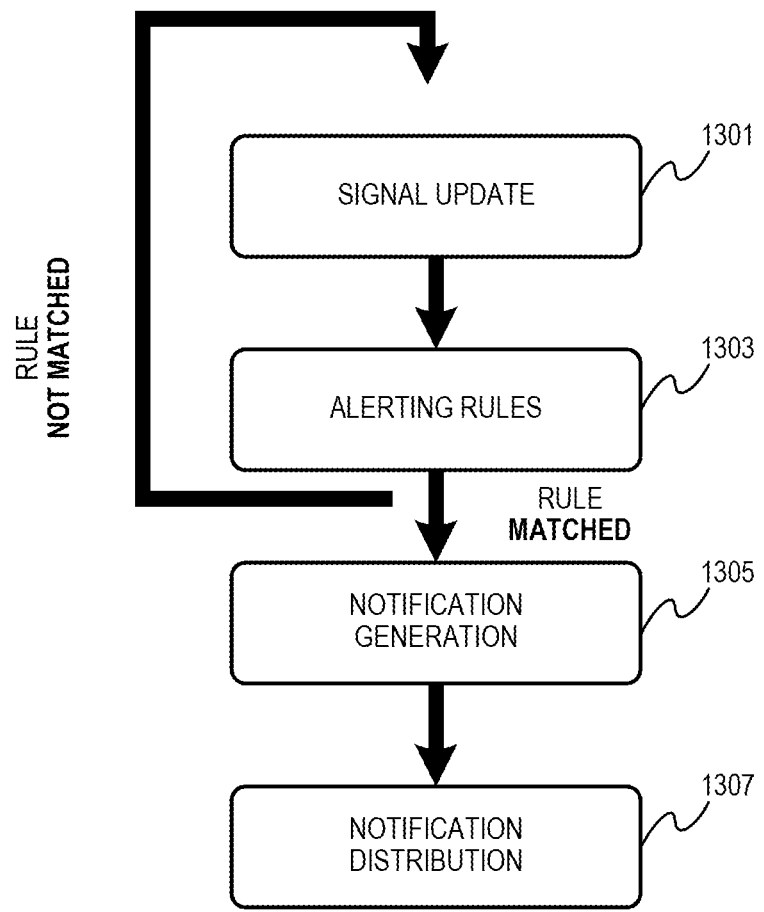
FIG. 13 illustrates processes associated with generation of the user experiences according to an example implementation of the present application for the alert chain.

FIG. 13 illustrates operations 1300 associated with the processing of the chain of alerts. For example, as explained above, a type, condition, performance, price and score can be processed as data, to determine whether to provide the user with an alert. Further, the user may view and consider the alerts being used by the overall community of users, to benefit from alerts generated by others. According to the example implementations, the user may subscribe to such a rule, and thus be alerted in response to changes in the signals described above.

At 1301, a signal update is performed. More specifically, as explained above with respect to FIG. 8 at 803, signal updating is performed. For example but not by way of limitation, and output of the watchlist may be provided, including but not limited to the signal strength vector and the signal strength classification.

At 1303, the output of 1301, such as the absolute values of the signal, or relative values of a signal as compared with the previous signal update are applied to the deterministic rules. For example but not by way of limitation, if a revenue has increased by 2% as compared with the previous signal update, and the user set a rule to provide an alert when the revenue has increased by 2% or more for a given company, the rule may be triggered. Similar or other deterministic rules, as disclosed above with respect to FIG. 12, are processed in real time as the updated information of 1301 is provided. Accordingly, the probabilistic output of the watchlist is applied to the deterministic rule base of the user, and an alert is either triggered or not triggered with each real-time update.

At 1305, a notification generation operations performed. More specifically, based on the user rule-based, a custom notification payload is generated for the user. For example but not by way of limitation, if a user has determined that for a revenue that has increased by 2% or more compared to the previous signal update, the user should receive an alert to sell a stock cut, such a notification payload is generated.

At 1307, the notification is distributed to the user. The distribution channel may be set to one or more modes, including but not limited to mobile application notification, email, simplified messaging service, or other communications means. Accordingly, a notification is pushed to a user in the desired manner of the user, containing the recommendation associated with the rule, which is triggered based on the real-time signal update provided to the rule-base.

While some example implementations may provide a recommendation, in real time, based on the real-time measurement of data collection, price checking and calculation, to provide the addition, the example implementations are not limited to recommendations. The foregoing example implementations may be integrated with approaches that provide for automatic trading, such that the user need not provided input for and execution of a decision.

Figure 14:
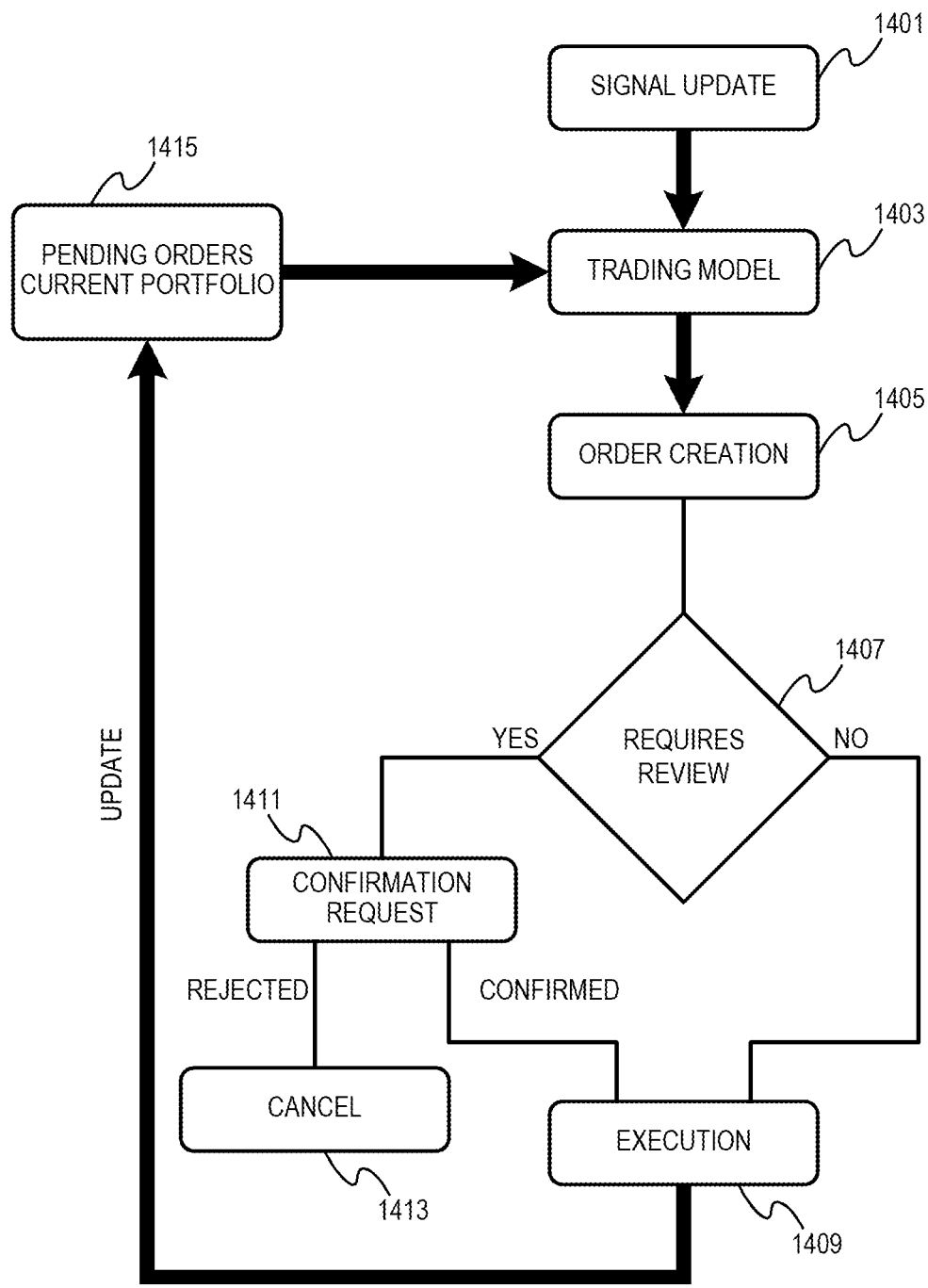
FIG. 14 illustrates processes associated with generation of the user experiences according to an example implementation of the present application for automated trading.

FIG. 14 illustrates a process 1400 associated with decision execution according to the example implementations. More specifically, instead of the user receiving and reviewing the signal classification and signal strength vector to receive an alert, an automatic system is provided that applies artificial intelligence techniques such as machine learning in a neural network to convert the signal classification and signal strength vector into a decision signal that can be submitted for execution of the decision. For example but not by way of limitation, the signal may be converted to a trading order for a brokerage service.

At 1401, in accordance with the foregoing example implementations, measured data is received from a plurality of alternate data sources, and processed on a real-time, automatic basis to provide real-time updates for the critical indicators.

At 1403, the updates are input into a trading model equal but not by way of limitation, the trading model may include an artificial intelligence approach such as machine learning in a neural network to provide trading decision-making. According to an example implementation, the trading model may be a neural network that is trained on historical stock prices and a history of signal updates associated with the measured signal according to the example Tatian. The input to the trading model is the signal data, and the current state of the user account. For example, if the user has open or pending orders associated with a purchase or sale, the model takes this information into consideration. As an output, the trading model 1403 provides a decision or an action, instead of an alert or a recommendation as is done in other example implementations.

At 1405, an order is created. For example, the order may be created by submitting an automated request to a seller, including but not limited to a brokerage service, and optionally confirming the order with the user. For the user confirmation, this may optionally be provided by a notification distribution channel, as explained above with respect to FIG. 13.

At 1407, the system performs an operation to determine whether user review is required. If no user review is required, the order is executed at 1409. For example, the order created at 1405 may be executed with a seller, such as a brokerage service.

Alternatively, if at 1407 it is determined that user review is required buyer, the confirmation request is sent at 1411, as explained above through a notification distribution channel. If the user confirms the order at 1411, the order is executed at 1409. If the user does not confirm the order of 1411, the order is considered to be rejected, and cancel at 1413.

More specifically, the user may be provided with a regular notification, such as a push notification. The regular notification may be periodic, such as every day, or every morning of every day at the same time. The push notification may include, but is not limited to information associated with a data condition. For example but not by way of limitation, if, based on the foregoing example implementations, it is determined that the company in question is forecast to not meet an expected condition, such as missing an earnings call, based on the forecast associated with the signal, the user may be informed of that data condition. Further, the user may be provided with an indication of the degree of confidence. In one example implementation, the user may be provided with a confidence score in terms of percentage.

Additionally, according to the example implementations, the push notification may include a selectable option that only requires a single user action to make a decision based on the information provided in the push notification. For example but not by way of limitation, the user may be provided with the question of "do you wish to invest?" followed by a selectable option of "yes" or "no".

If the user selects the option of "yes", a purchase order is executed based on predefined user settings, such as the user preferences. According to one example implementation, if the user has included, in his or her user settings associated with the online application, a default setting to immediately execute the order, then the order will be submitted as soon as the user has made the selection without delay. According to another example implementation, the order may be executed across a time period, such as the business day. According to one example implementation, a user may include in his or her user preferences, a default setting to make a purchase for a prescribed amount, such as $1 million, at even intervals over the course of the day.

Optionally, the default setting may allow the user to adjust the proportion of orders over the course of the day to be at uneven intervals, such as closely bunched at 20 minute intervals during a certain part of the day, and spread out over longer intervals of one or two hours during another part of the day. Also optionally, the default setting may allow the user to adjust the amount of each order to also be even over the course of a day, such that the amount of investment is frontloaded towards the beginning of the day and gradually decreasing over the course of the day, backloaded to the end of the day and gradually increasing over the course of the day, matching to a profile curve defined by the user, matching to a prediction of an increase or decrease in the stock price at the next interval, based on an output of the recommendation in the foregoing example implementations that provide the forecast, or other user determined default setting.

Similarly, the user settings may provide the a limit order in the default, such that if the price exceeds a limit price, the order is no longer executed for the rest of the day. Thus, according to one example implementation, if a user selects "yes" to purchase $1000 of a stock divided evenly over five hours, with a $200 order being placed every hour, and the stock price than exceeds the limit price during the third hour, then the fourth hour order of $200 will not be executed if the stock price continues to exceed the limit price. Similarly, at the fifth hour, if the stock price exceeds the limit price, that fifth hour order will not be placed.

With respect to the execution of the order, the user may provide, in the default settings, one or more default service providers, such as a broker. Further, the user may provide one or more stock exchanges upon which to execute the order. The user may specify a percentage of an overall order to be placed with each of the brokers that is even, uneven, or proportionally divided automatically based on past performance relative to past recommendation.

As for the order size, the user default setting may provide for a predetermined order size, such as 100 shares, or a predetermined amount, such as $1000 worth of shares. Thus, the user need not decide the number of shares, the amount of the shares, which broker or brokers or stock exchanges to contact, the timing of the order placement and execution, the proportionality or evenness of the timing or amounts over a time, because those parameters are already determined based on the previously provided user settings. Accordingly, the user only need select "yes" or "no", to execute the order according to the default user settings determined by the user.

While the foregoing example implementation refers to a single stock and a single user action associated with making a purchase of that single stock, the example implementations are not limited thereto. For example but not by way of limitation, the user may receive multiple push notifications, either time simultaneously or spread out over time based on a desired user preference, each associated with a different company. The companies to the provided in the push notification to the user may be determined based on the user preferences, such as those with a confidence score above a certain percentage, those on a list of interested or tracked companies by the user as shown in the foregoing user experience implementations, or those having a difference between the forecast value as determined by the example implementations as compared with the expected earnings call that has been published by a prescribed threshold.

In addition to a one to one relationship between the user action and the trade execution, the user may be provided with an option to execute all of the multiple push notifications that are provided together, with a single decision, by selecting an option such as "yes to all". If such an option is selected, then all of the orders will be executed according to the predefined user preferences as explained above.

The foregoing example implementations may provide a push notification by modes known to those skilled in the art. For example but not by way of limitation, the push notification may be provided by email, text message or SMS (short message service), chat via online social networking service, or the like. Further, the push notification may be provided not just in a visual presentation, but alternatively or conjunctively as an audio message, such as by a speaker in a home device, such as Amazon Alexa or the like.

Further, the foregoing example implementations may provide the option during transport, such as to a driver receiving the signals, such as via a telecommunications network including but not limited to a 5G network. Thus, the driver, by audio communication with a speaker and microphone or other input/output devices would be understood by those skilled in the art, may execute, by a single voice command, the instruction to execute the order as explained above. Similarly, a passenger may also use the system. Thus, the example implementations may provide for hands-free placing of an order.

Additionally, while the example implementations may be implemented on a mobile communication device such as a smart phone, the example implementations are not limited thereto. For example but not by way of limitation, the user settings may provide the user with control over the single action purchase modes, so as to require the user to join from an authenticated device, such as by requiring two factor authentication prior to accessing the recommendations, or the push notifications, or to provide a privacy preserving aspect, such that other form of authentication, such as login, biometric, second factor or other aspect is required to receive the push notification. Similarly, in place of the user providing an audio response or selecting a specific option on a screen, the user may instead use gestures, signals or other biometrics to indicate a decision.

For example but not way of limitation, the user may determine that, in the user settings, if the first finger is placed on a fingerprint detector, then the user is indicating that the order should be executed, whereas if a finger other than the first finger is placed on a fingerprint detector, then the user is indicating that the order should not be executed. Such an example implementation would allow the user to make his or her decision in the presence of other individuals who, although they may be able to hear or see the user interface, cannot understand whether the single action of the user is a decision to execute the order not to execute the order. While the foregoing example refers to a fingerprint, other gesture or user signal as defined in the user settings may be employed. Similarly a voice command other than "yes" or "no" may also be used, so as to prevent a third party from knowing what the user has decided to do simply based on hearing the audio response of the user. Thus, the privacy of the user is protected in circumstances where the user interface can be seen or heard by others.

In terms of hardware, the foregoing example implementations may be implemented in a client device such as a smart phone, laptop or the like. Further, and as also explained herein, the foregoing example implementations may be integrated with other devices, such as a device, a processor and memory of an automobile or other vehicle, or other device as would be understood by those skilled in the art. The foregoing user experiences may be provided by the user in a "user setting" aspect of an online application as parameters that are input by text entry, radio button, checkbox, slider or other visual manner of user input and user output as would be understood by those skilled in the art.

The example implementations described herein may be executed in the form of machine readable executable instructions stored in a memory, which are configured to access the predefined user settings, which may be stored, such as in a database, either locally or remotely in the cloud for example, such that the user settings may be accessed by one or more devices as are authorized by the user to execute the instructions. Instructions may also be provided in the form of an online user application.

Before the foregoing example implementations are executed to provide the push notification, the user must enter the default user settings. When the online application is installed, a default series of settings may be provided based on a profile of information associated with the user. For example but not by way of limitation, if the user self identifies their risk level as high, medium or low, then a default setting may be selected from a corresponding set of predefined profiles, based on aggregated information of other users in association with their risk profiles, to match the default setting of the user with an average default setting for other users having a similar risk profile. Factors other than the risk may be used to determine the default settings.

Additionally, the user may have multiple default settings, and different default settings may be applied depending on different user situations that may be automatically accessed by the online application. For example but not by way of limitation, if the online application it is aware that the available cash funds of a user in their bank accounts exceeds a prescribed level, the default settings may be set to one of the default settings in which the amounts, frequency, price limit or other aspect of the user settings are adjusted to account for an increased availability of investment funds, or an increased risk profile.

Optionally, a user may adjust the settings depending on a date for time, such as before or after earnings announcements, start/end of fiscal year, or other critical timing as would be understood by those skilled in the art. Similarly, the timing may be based on a condition of the user, such as after employer payday, after monthly debt payment such as mortgage, credit card, etc., or the like. Similarly, the online application may prompt the user to select a change among the default settings based on a change in the user's financial situation, such as new job, layoff, major purchase such as home or vehicle, vacation, or other financial event. Thus, the user's selection of a default setting may be partially or completed supported or automated. Alternatively, instead of inputting one or more user settings, the user may generate a rule base that is applied to the user settings, or that is applied directly to the "yes" decision on a push notification.

Figure 27:
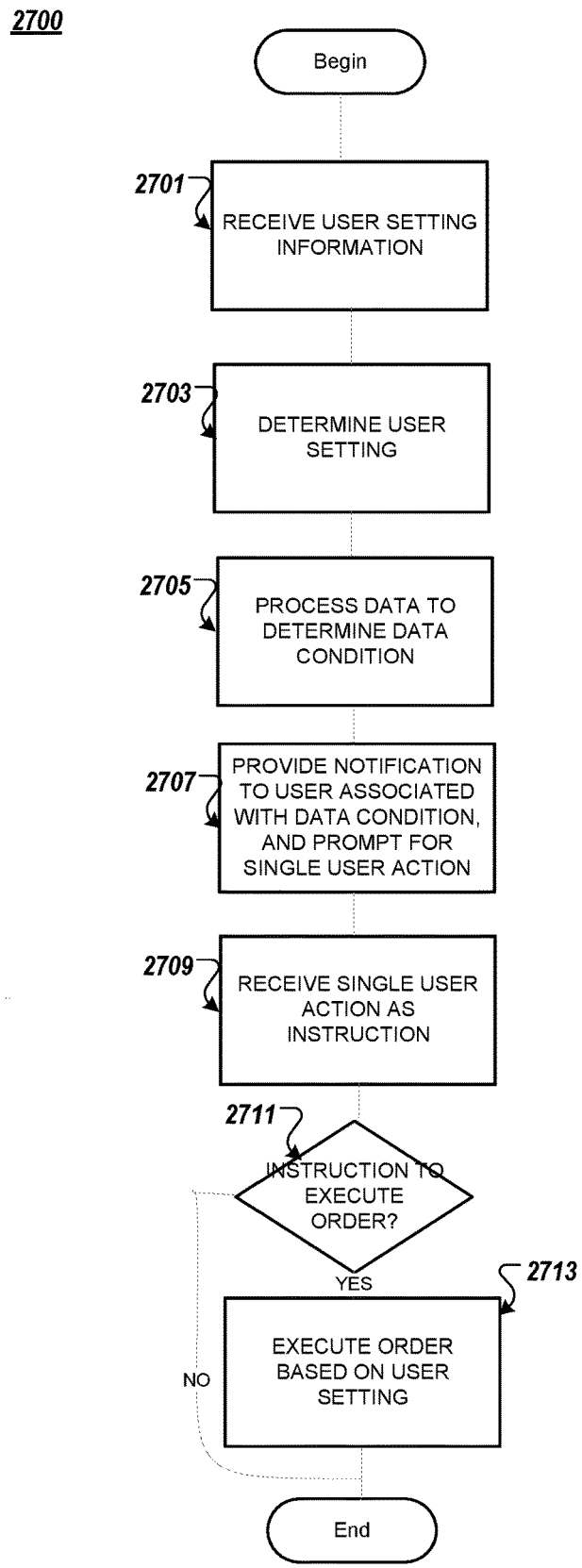
FIG. 27 illustrates processes associated with execution of an order based on a single user action instruction and user settings, in response to a data notification provided according to an example implementation of the present application.

FIG. 27 illustrates an example process 2700 associated with the foregoing example implementations. More specifically, the example process 2700 is directed to execution of an order based on a single user action, wherein the order is executed based on a user condition, and in response to a push notification to a user that includes a data condition at a prompt for a single user action.

At 2701, once an online application has been installed, information that is associated with a user is received as user setting information. For example but not by way of limitation, as explained above, information associated with a user's profile, such as risk information, financial information, demographic information or other information that is associated with the user is received by the online application.

At 2703, the user setting is determined. More specifically, the user setting information received from the user at 2701 is assembled and stored, such as in a database, as a series of preferences, thresholds, parameters or the like. Further, and as explained above, additional support tools or automated processes for determining a user setting, such as current time of a time period, such as end of quarter, end of year, payday, before or after major purchase event, or the like, may be taken into account. As an outcome of operation 2703, the user setting is stored in a machine readable form such that it can be accessed and applied to an order, so as to provide the necessary instructions or execution of the order without requiring any user input.

At 2705, the example implementations perform processing of the data to determine a data condition. More specifically, as explained above, a plurality of alternate data inputs of different types are processed and normalized, and applied to a series of operations in order to generate a forecast or an expected value, or a recommendation. Further, the recommendation, forecast or expected value may also have an associated degree of confidence. Thus, the data condition is generated, including the forecast, expected value or recommendation, as compared with predicted information, such as expected quarterly earnings, and a degree of confidence associated with the recommendation, forecast or expected value.

At 2707, the data condition is provided to the user in the form of a push notification, such as SMS, email or the like, as explained above. Further, the user is prompted for a single user action, such as "yes" or "no". The user must determine only whether to execute an order based on the provided data condition. The information at 2707 is provided to the user via a user interface, which as explained above may include but is not limited to visual and audio inputs.

As 2709, a single user instruction is received. The single-user instruction is based on a single user action. For example but not by way of limitation the single-user action is the user selecting "yes" or "no". This may be done, as explained above by visual or audio input to the client device, which may include a mobile phone or a laptop, as also explained above.

At 2711, a determination is made as to the instruction associated with the single-user action. For example but not by way of limitation, it is determined whether the single user action is to execute the order or not execute the order. If the operation at 2711 determines that the single user action is an instruction to not execute the order the process terminates.

On the other hand, if the single user action is determined to be an instruction to execute the order, then at 2713, the order is executed based on the user setting that was determined at 2703. More specifically, the user setting provides information that is including but not limited to whether the order is executed immediately or at a later time, whether the order is executed as a single transaction or a plurality of transactions, whether, if a plurality of transactions is requested, whether the timing and amount are evenly or unevenly distributed over the course of a day or other time period, and whether there are any price limits or other limits, or patterns in the case of an uneven distribution over the course of the day or other time period, and identity of one or more brokers or markets that constitute service providers, or other user settings as explained above. Thus, the order is executed based on a single user action, in association with the user settings.

At 1415, an operation is performed to update the user portfolio, so as to indicate that the order has been executed. Optionally, the user may be provided with a report via the communication or distribution channels explained above, to confirm that the order was executed, to provide an update of the portfolio, and/or to remind the user of any pending or open orders.

The above-disclosed hardware implementations may be used to process the alert chain disclosed in FIGS. 12-14, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

The foregoing example implementation of the automatic trading aspects is performed continuously and in real time. Thus, plural orders may be simultaneously executed, or may be in different stages of execution. To the extent that confirmation by the user is requested, the user may decide to execute some orders, reject other orders, and to not make it make patient keep still other orders pending. To the extent that confirmation is not required by the user, automatic execution may continue without providing the user with any review prior to the execute acute the notification of pending order or current portfolio immediately after the execution. Implementation, when review is not required by the user, another subject that is not military. A require, a change in availability on, that is the identity for justice, or that of entity side of order exceeds a prescribed on individual or periodic purchase amount.

The foregoing example implementations automatically perform a determination of the critical indicator type, provide a calculation of performance, and generate a score, for each of the listed companies. For the foregoing example implementation of the user experience, determination of the leading indicator, and comparison of performance is provided on a real-time basis. As explained above, a mixture of rule-based, deterministic approach is blended with a probabilistic approach, such as the artificial intelligence neural network approaches described herein. The architecture may be executed on a big data server, such as in a server farm or in the cloud. Accordingly, the signals are processed as they are received, in real-time, in contrast to related art approaches, which perform batch processing. Further, cloud computing may also be used. To the extent that the necessary processing power is available, the signal processing associated with the example implementations may be performed on a standalone machine. Due to the present example implementations being able to provide real-time information, a user may be able to receive the recommendation and execute a decision in a timely manner that provides for a significant impact on the return on investment. In contrast, related art approaches do not take into consideration the processing of the real-time measured data, instead only use expected data information.

Figure 15:
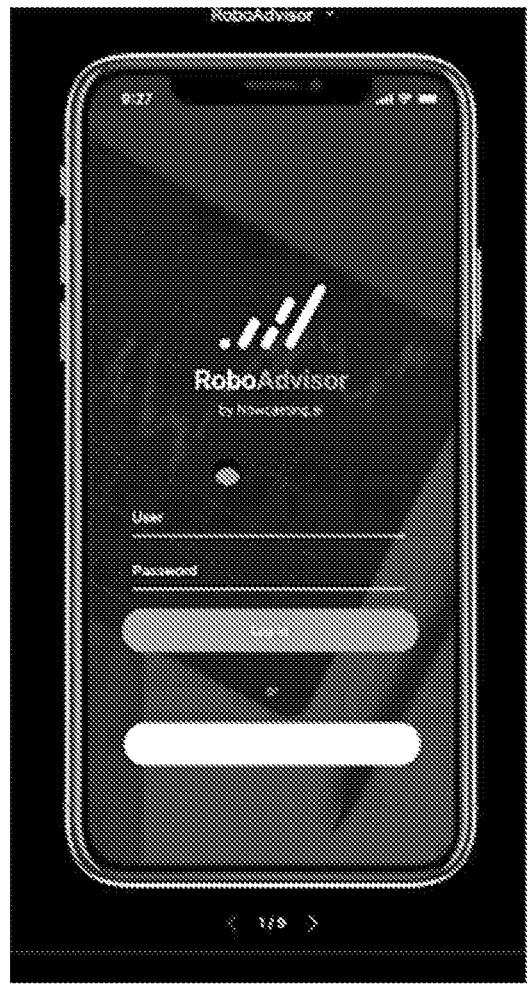
FIGS. 15-16 illustrates processes associated with generation of the mobile user experiences according to an example implementation of the present application for automated trading.
Figure 16:
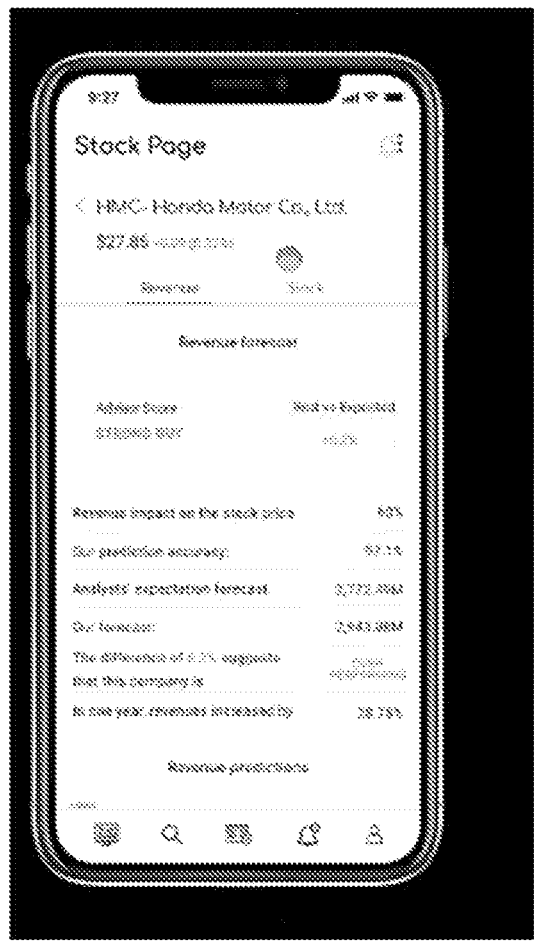

While the foregoing example implementations are shown on a screen of a display such as a laptop or desktop computer, the example implementations are not limited to the or two in terms of the user experience. For example but not by way of limitation, a user experience associated with a mobile device may be substituted for or used in combination with the foregoing example user experiences. FIGS. 15-16 illustrate such example implementations associated with a mobile device.

Figure 29:
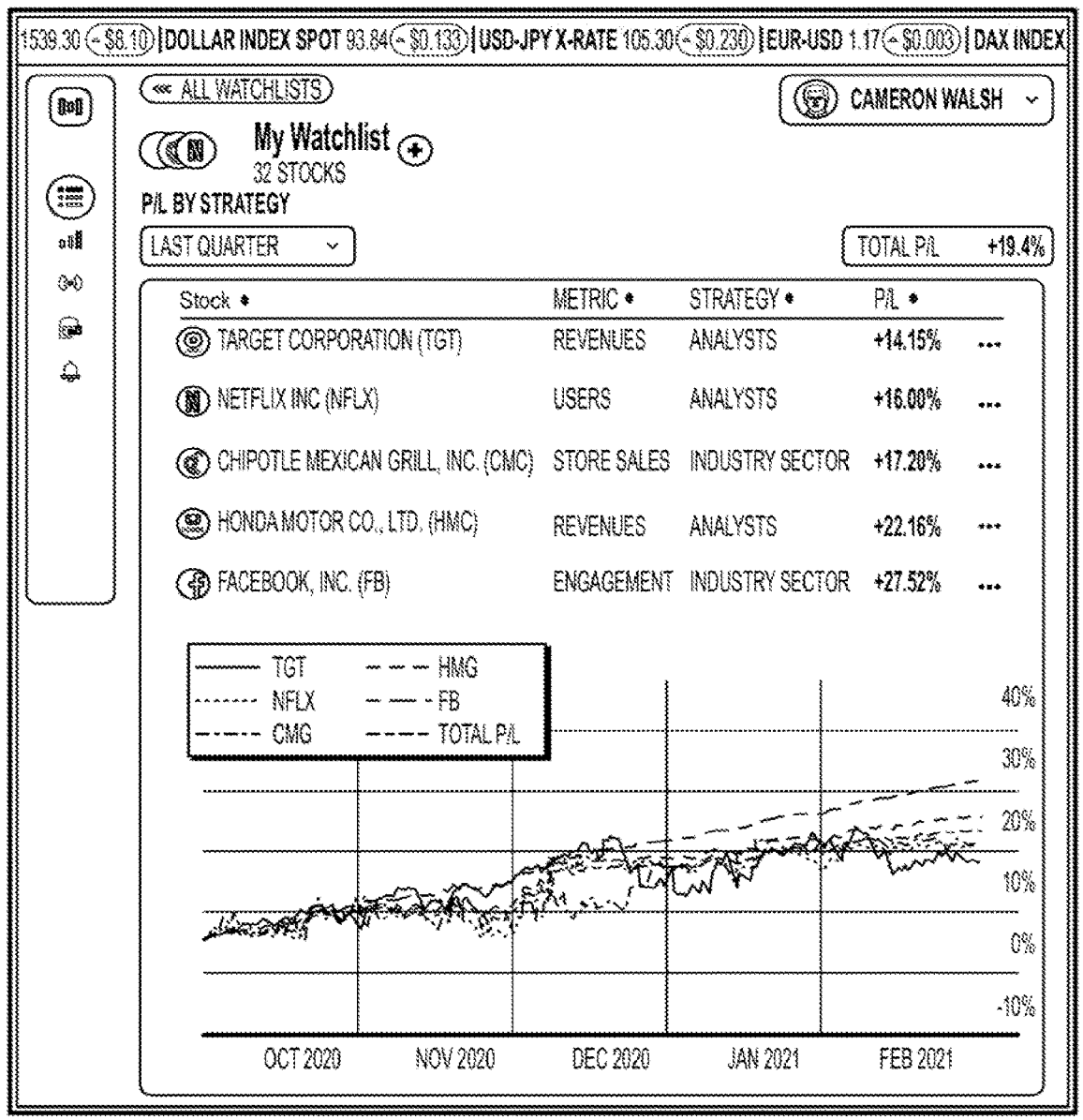

Additionally, FIGS. 28 and 29 illustrate additional user experiences associated with the example implementations. For example, FIG. 28 illustrates interfaces 2800. More specifically, at 2801, a comparison between company performance and industry performance is shown. More specifically, a P/L comparison is generated based on the output provided by the foregoing example implementations, based on the alternate data sources as processed by the architecture and operations described herein to generate the expected P/L value based on the signals. As can be seen, the company is shown to be performing well above the industry level. At 2803, a P/L comparison for an industry section that provides the analyst comparison (e.g., overperforming, underperforming, neutral) as compared with the expected P/L value generated by the signals according to the example implementations.

FIG. 29 provides a user interface associated with a comparison 2900 of the companies on the watchlist as disclosed herein. More specifically, the result per stock is shown over a prescribed time period, e.g., most recent quarter. As can be seen, each of the companies is shown, along with the metric that forms the basis of the evaluation, the strategy selection, and the P/L result over the period. The comparative results are graphically illustrated. Thus, a plurality of companies may be compared using data that has been processed and normalized as explained above, while retaining the ability to evaluate each company based on its most critical and/or sensitive parameter with respect to company financial performance, as also explained above.

The foregoing example implementations may also be used to provide users with a discount for goods and or services associated with a company. The discount may take the form of a rebate, a reward, a price reduction or other form of benefit or compensation to a user. For example but not by way of limitation, the discount may be provided to a user based on the amount for number of transactions by the user on the account of the company shown in the example user experience, for which the example implementations are performing the foregoing operations on the foregoing structures.

Optionally, according to the example implementations, a feedback loop may be provided. More specifically, a user may provide input on the outcomes and recommendations of the model, which may be used to calibrate the model. For example, but not by way of limitation, if, based on the critical parameter or indicator, combined with a performance, a recommendation has been set with which the user disagrees, the user may provide a suggestion for feedback into the system. The user may suggest that the critical indicator is not appropriate, and instead suggest another critical indicator, as well as being able to suggest that the recommendation is not a desirable recommendation. According to one example implementation, a user may indicate that an appropriate critical indicator of social media or an online service may not be user engagement or number of users alone, but may instead be related to online advertising, clicks or some other parameter. This feedback may be used by the system to retrain or recalibrate the forecasting tools, so as to adjust according to consumer preferences and demands.

Optionally, an automated trading tool may be provided that implements certain recommendations under certain circumstances. For example, but not by way of limitation, for items on the watchlist that are also on the alert chain, the instruction from the user in the user preferences may indicate that a particular stock should be bought or sold when one or more of the conditions in the alert chain have been met. Optionally, the user may create a completely different and separate alert chain for automatically trading, as well as for providing alerts. Thus, sales and purchases may be executed by the user automatically, thus avoiding any delay, and immediately providing such instruction. Such a system may be valuable during certain use cases. For example, but not by way of limitation, the automated trading tool could be valuable when the user is traveling or on vacation, during peak periods of activity or intense financial news, such that the user cannot quickly or in a timely manner act on alerts or recommendations, or simply for user convenience.

According to the example implementations, the automated trading tool may include receiving, by an online application associated with a user device, user preference information; based on the received user preference information, determining one or more user settings, wherein the one or more user settings is assembled and stored in a database, as a series of preferences, thresholds, or parameters, and in a machine readable form such that it can be accessed and applied to the automated user request, so that the automated user request is executed without user input of the user preferences at a time of the automated user request; processing data to determine a data condition, wherein, to determine the data condition, a plurality of alternate data inputs of different types are processed and normalized, and applied to a series of operations in order to generate a forecast or an expected value or a recommendation having a degree of confidence, and the data condition is compared with third party information; generating an electronic notification indicative of the data condition, wherein the electronic notification includes the data condition compared with the third party information, a confidence indicator associated with the data condition, and a query to perform a single action; in response to an automated determination to perform the single action, the user device generating an automated instruction to execute the automated user request; and based on the automated instruction, executing the automated user request based on the determined one or more user settings that include information on whether the order is executed immediately or at a later time, whether the order is executed as a single transaction or a plurality of transactions, whether, if a plurality of transactions is requested, whether the timing and amount are evenly or unevenly distributed over the course of a time period, whether there are any price limits, or patterns in the case of an uneven distribution of the amount over the course of the time period, and an identity of the one or more brokers or the one or more markets.

Also optionally, in addition to the company financial data being used as explained above, other publicly available data associated with a company may also be used. For example, but not by way of limitation, the public facing announcements, social media posts, public presentations, or other information may be sensed or detected for leaders of a company associated with one or more social media accounts, industry events, news releases or publications, or other information. This information may in combined into the sentiment analysis.

The foregoing example implementations may have various advantages and/or benefits. For example, but not by way of limitation, the example implementations may provide a way of determining performance automatically and in real time. Related art approaches may conduct manual research and generate performance indication manually over a period of many hours in many days, and an investment advisor may manually deter mine a score. However, the related art approaches do not have any way of taking disparate data from different data sources, performing operations on the data such as normalization, de-duplication, classification and optionally others, applying the refined data to a forecasting tool, and generating a forecast or recommendation based on a determination that a particular indicator is critical, all automatically and all in real time.

This distinction is crucial, because the information and recommendations must be provided in real time in order for a user to be able to effectively make decisions and execute the decisions in a timely manner, before the forecast has again changed due to the passage of time, the dispersion of information, new information or other events. The real-continuous determination and recalculation and re-forecasting provides information and recommendations that is precise, accurate and available for decision support to the user.

Data Cleaning and Pipelining

According to the foregoing example implementations, users are sourced to create a panel. As provided herein, a panel may be selected according to the following selection process.

An optimal panel to be used for forecast may be generated. More specifically, the selection process includes performing a filter operation on the candidate users for the panel. For example, but not by way of limitation, the filter operation may be performed by the application of a filter, so as to generate a panel meeting one or more criteria. According to the present example implementation, the criteria may include, but are not limited to, the panel including users that are representative of a population (e.g., US population) for their geolocation, with a substantially stable number of purchases from a starting date to an ending date (e.g., 2011 to the current date), with a consistent number of transactions. Optionally, outliers and duplicates may also be removed.

Figure 17:
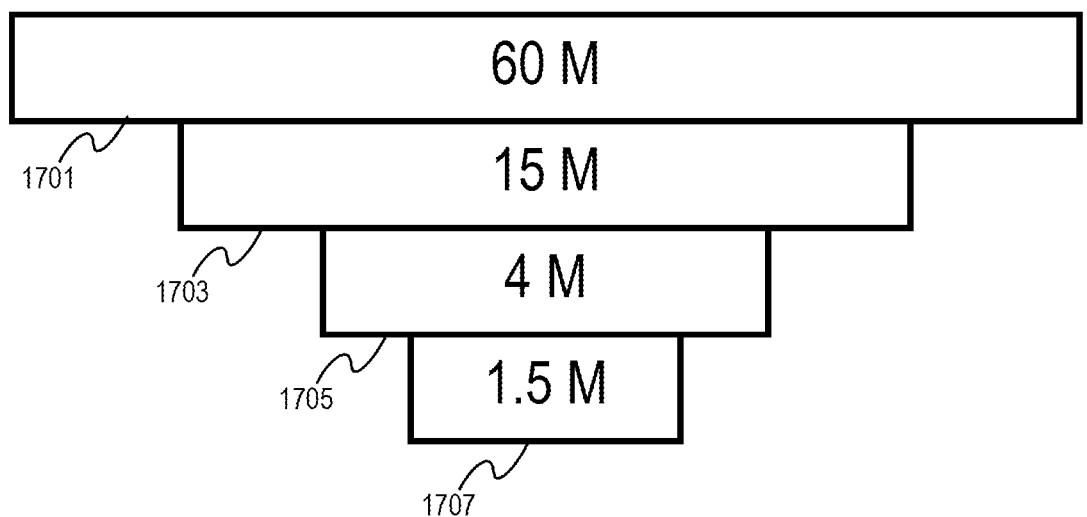

As shown in FIG. 17, a selection process 1700 may be performed. Initially, the pool of candidate users is a fragmented panel consisting of 60 million users at 1701. After a first filter process performs the filtering operation such that the pool of candidate users is representative of the population for their geolocation, the filtered pool is narrowed to 15 million users at 1703. Subsequently, another filter operation is performed to confirm a stable number of purchases over a time interval, further narrowing the pool of candidate users to 4 million users at 1705. At 1707, outliers and duplicates may be removed, and a filter operation may be performed for a consistent number of transactions, to produce an optimal panel of 1.5 million users.

Figure 18:
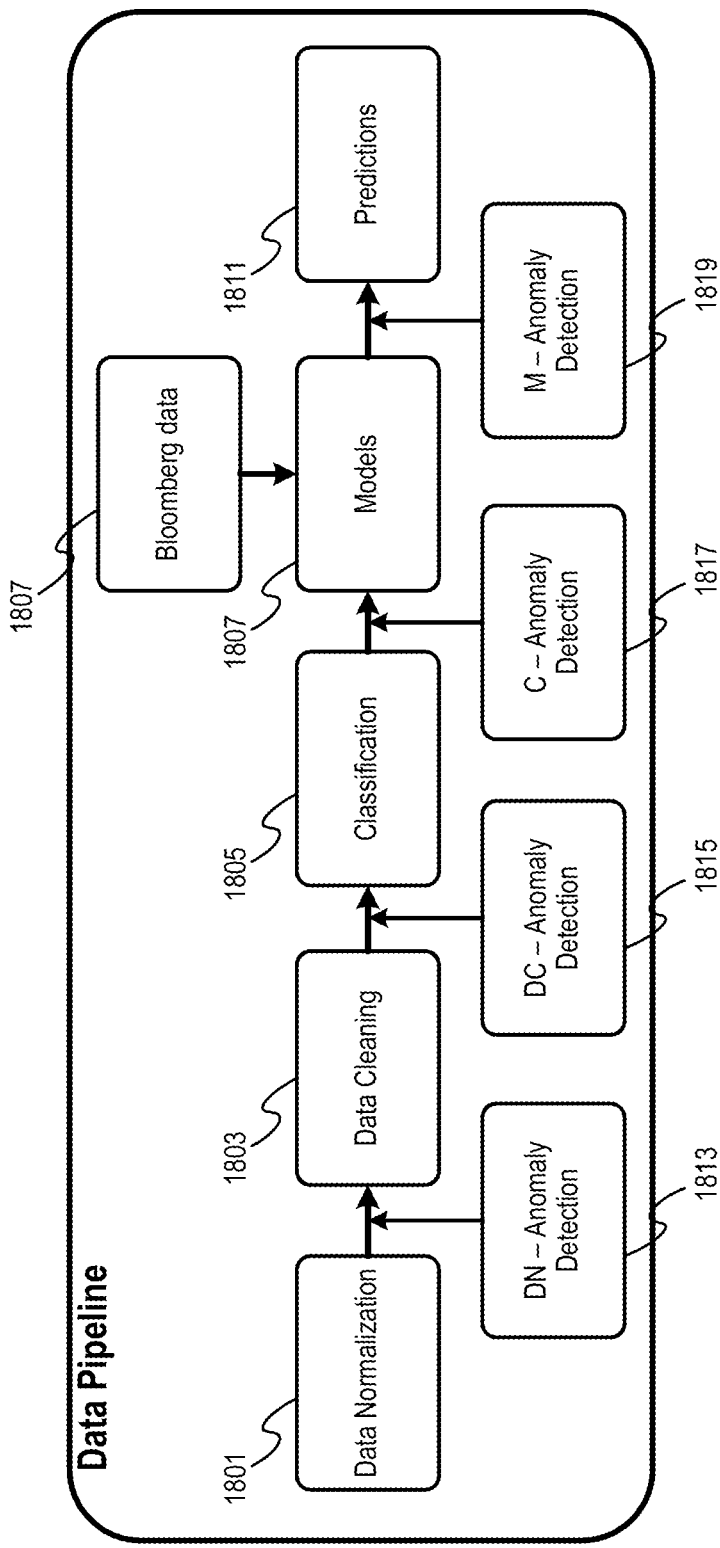

FIG. 18 illustrates a data pipeline according to an example implementation. At 801, data normalization is performed. Data that is received from different institutions may have different structures. In order to properly use the data from the different institutions, the data must be normalized with a fixed format. More specifically, the data is transformed from a text format into a distributed database that is designed to operate on top of the transactions.

At 1803, a data cleaning operation is performed. More specifically, the data that is not required or desired for the data processing pipeline 1800 is removed. For example but not by way of limitation, duplicated transactions, duplicated accounts and duplicated users are identified and removed. Further, incomplete data, such as incomplete transactions with missing data, are also removed from the data. Accordingly, and as explained above with respect to panel selection, the base of users that follows the selection process and filter operation is maintained in the user database, and the outliers and duplicates are removed.

After the data cleaning 1803 has been completed, a classification operation 1805 is performed. In this operation, each of the transactions in the database is classified. The classification is performed by analyzing the description of the transaction, and associating a correct merchant name with the description. In this operation, the quality of the association directly and critically influences the quality of the correlation and rejections that will be described further below. More specifically, to reach a desired accuracy, such as close to 100%, a combination of automated machine learning algorithms is combined with manual human controls.

As an example of the foregoing classification operation 1805, an example extract is provided. According to one example implementation, an average monthly volume of processing may be more than 200 million transactions; each of those transactions must be associated with a correct company.

FIG. 19 illustrates the example extract. As can be seen in the example extract 1900, the name of the merchant is found in each of the transactions.

Once the cleaned data has been classified as explained above, a modeling operation 1807 is performed. More specifically, the modeling operation 1807 generates forecasts. As inputs, the modeling operation 1807 applies data output from the classification 1805, as well as third-party input, for example Bloomberg data 1809. In the modeling operation 1807, many forecasts are combined, to obtain an optimal results. The modeling operation 1807 is specialized to a category associated with the company. Further, the modeling operation 1807 compensates for various bias factors, such as seasonality and the like.

Figure 20:
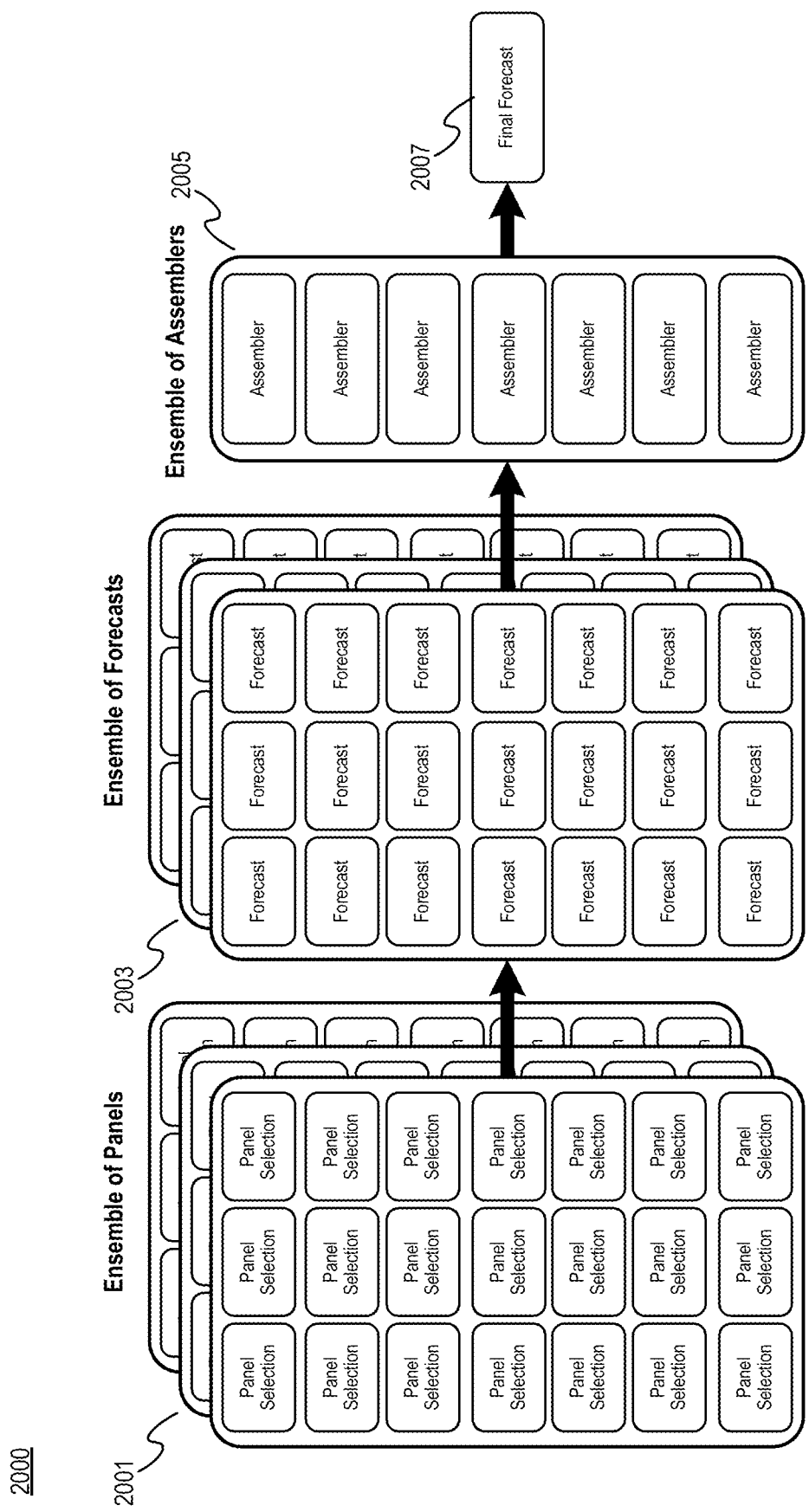

FIG. 20 illustrates an example implementation 2000 associated with the modeling operation 1807. More specifically, a plurality of sets of panels 2001, subject to the foregoing operations of the data pipeline 1800, are provided to the plurality of corresponding sets of forecasts 2003; outputs of the sets of forecasts 2003 are provided to plural assemblers 2005, to generate a final forecast 2007.

In the modeling operation 1807, different categories of companies may require different algorithms to generate the forecasts. For, but not by way of limitation, the algorithms must incorporate the different behavior of consumers for the different structures of revenue within a company. Some of the categories may include, but are not limited to, fully owned restaurants, franchise restaurants, supermarket chains, insurance, and other companies.

The modeling operation 1807 also provides for bias correction. For example but not by way of limitation, the panel data may include historical data of several years, from thousands of users that shared their data in exchange for a token or reward. Such an approach to obtaining the data allowed for a more complete understanding of the bias impacted by the panels that are not randomized, and algorithms for the correction of the bias.

Figure 21:
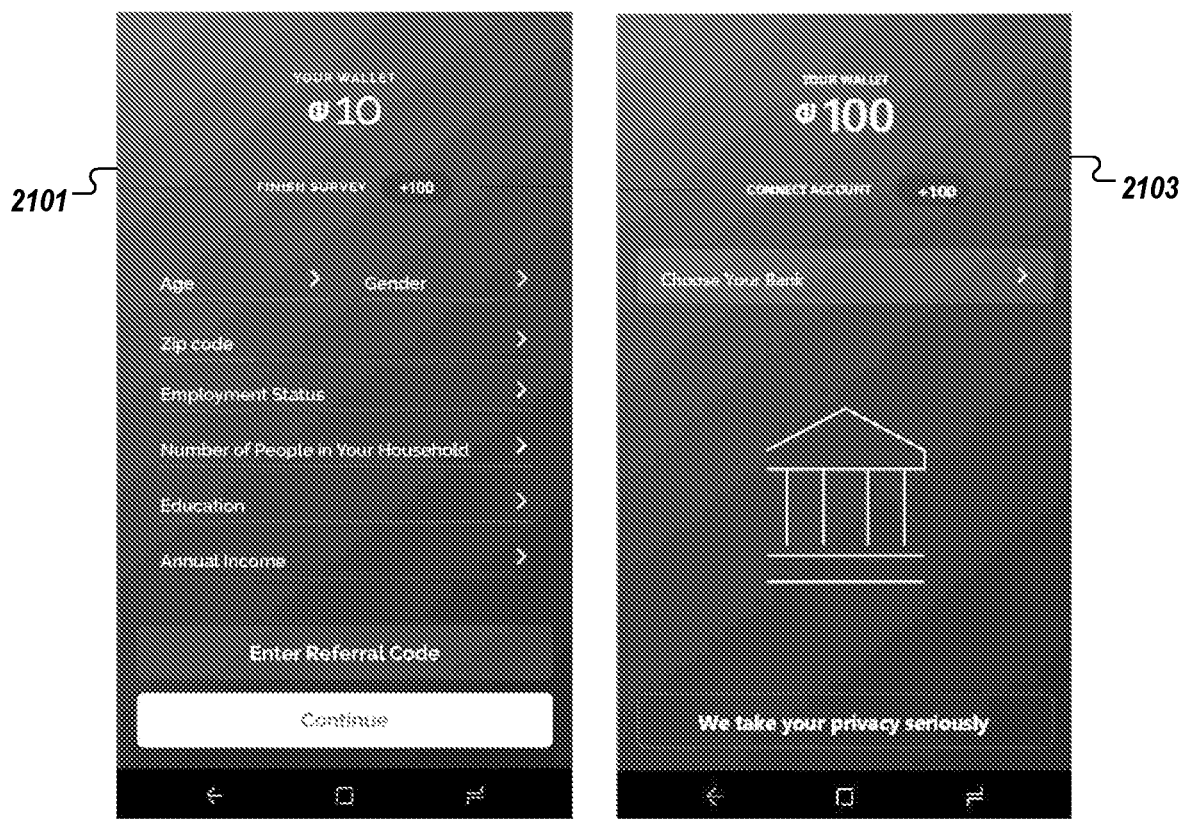

FIG. 21 illustrates a user experience 2100 associated with obtaining the information. At 2101, a user is provided with an input screen to input data and enter a referral code, as well as a number of points that may be associated with completing the survey. At 2103, the completion of the survey by the user results in the number of points being increased, and an option for selection of a bank where the points may be deposited, as well as a privacy statement.

To perform bias correction, historical data points are analyzed, to determine how the bias behaves across time. According to one example implementation, 9 algorithms were created for adjusting the bias in the data. Then, those 9 algorithms were combined with three other algorithms that are used for tickers, and that are less impacted by the bias.

At 1811, an output of the modeling is provided to make predictions. More specifically, the data is aggregated and inserted in a database. The data in the database can be accessed and used by other rules, such as traders, and further retrieved for validation, back testing, etc.

Additionally, the data pipeline 1800 includes anomaly detection 1813-1819. More specifically, an output of each of the elements of the data pipeline is subject to anomaly detection, to identify anomalies that may compromise final predictions. As an example of the anomaly detection 1813-1819, dataflow anomalies in the pipeline chain may examine technical anomalies as well as data anomalies.

For example, but not by way of limitation, anomalies in the behavior of a company for which forecasting is being performed may be analyzed and provided, including, but not limited to the following:
1. Acquisitions or divestitures, sourced from third-party news sources
2. Changes in requirements that would result in different company behavior, such as accounting standards, sourced from, for example, but not by way of limitation, SEC (Securities and Exchange Commission) files.
3. Change in a ratio between franchisees and stores owned individually
4. A different duration of a quarter, such as changing from 90 days to 97 days
5. Special sales promotions or other promotional activities for weeks, which may vary from quarter to quarter
6. Releases of new products by companies.

According to an example implementation, representativeness is considered. More specifically, according to a specific example, in 2019 the US population was about 330 million individuals, with the average family size being 3.14 members, such that there are roughly 105 million families, some studies indicating the number to be as high as 128 million families. In the example implementations, the ratio between the number of US households and the best panel is roughly 70 to 85. Further, the ratio between the declared revenues of companies and the total amount of purchases in the panel is between about 70 and 90. This ratio is consistent with the expected value, and is consistent across different companies, such that the proportion of consumers is properly maintained the panels according to example implementations.

Figure 22A:
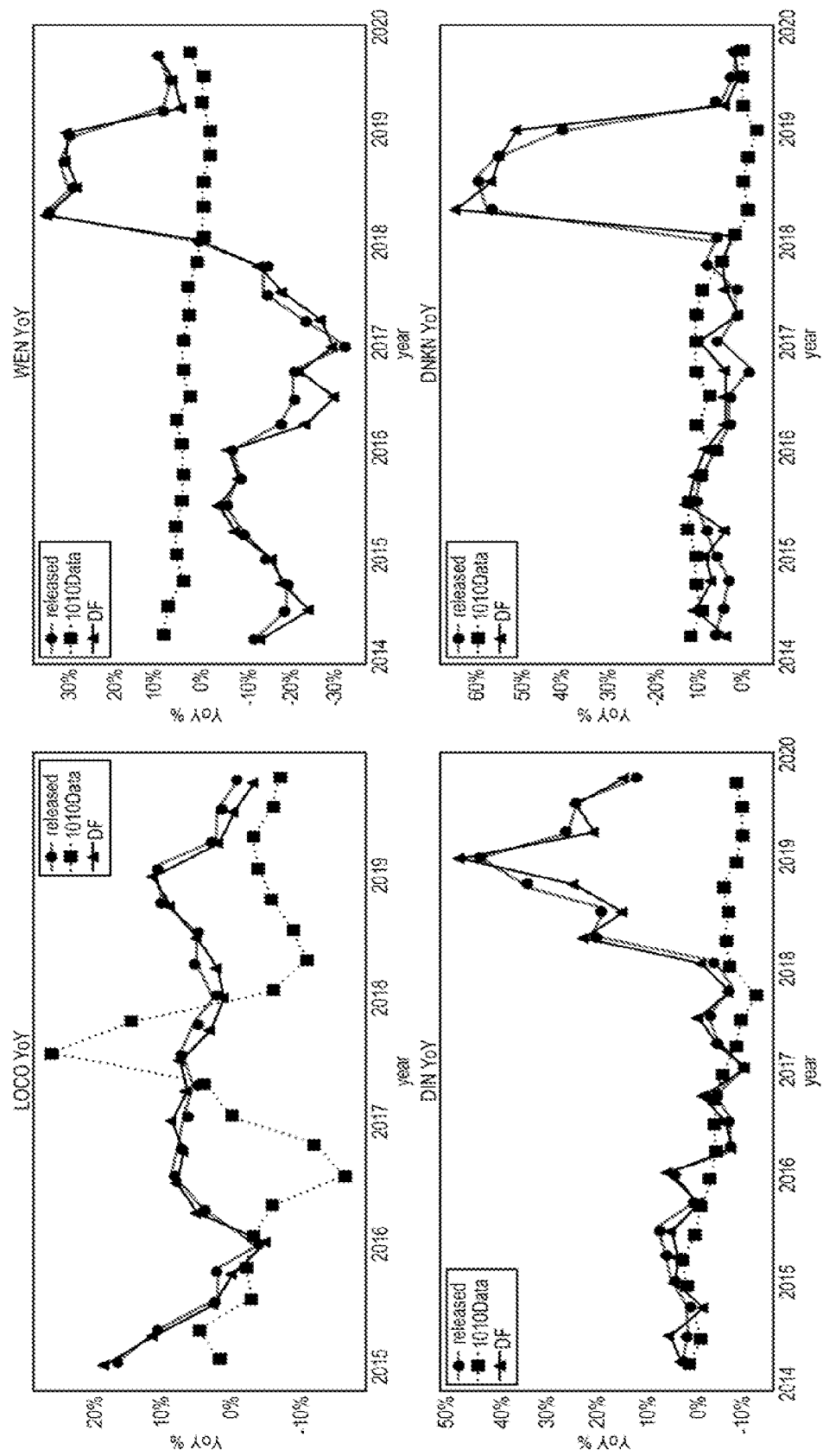
FIGS. 22A-22B illustrate various example implementations.
Figure 22B:
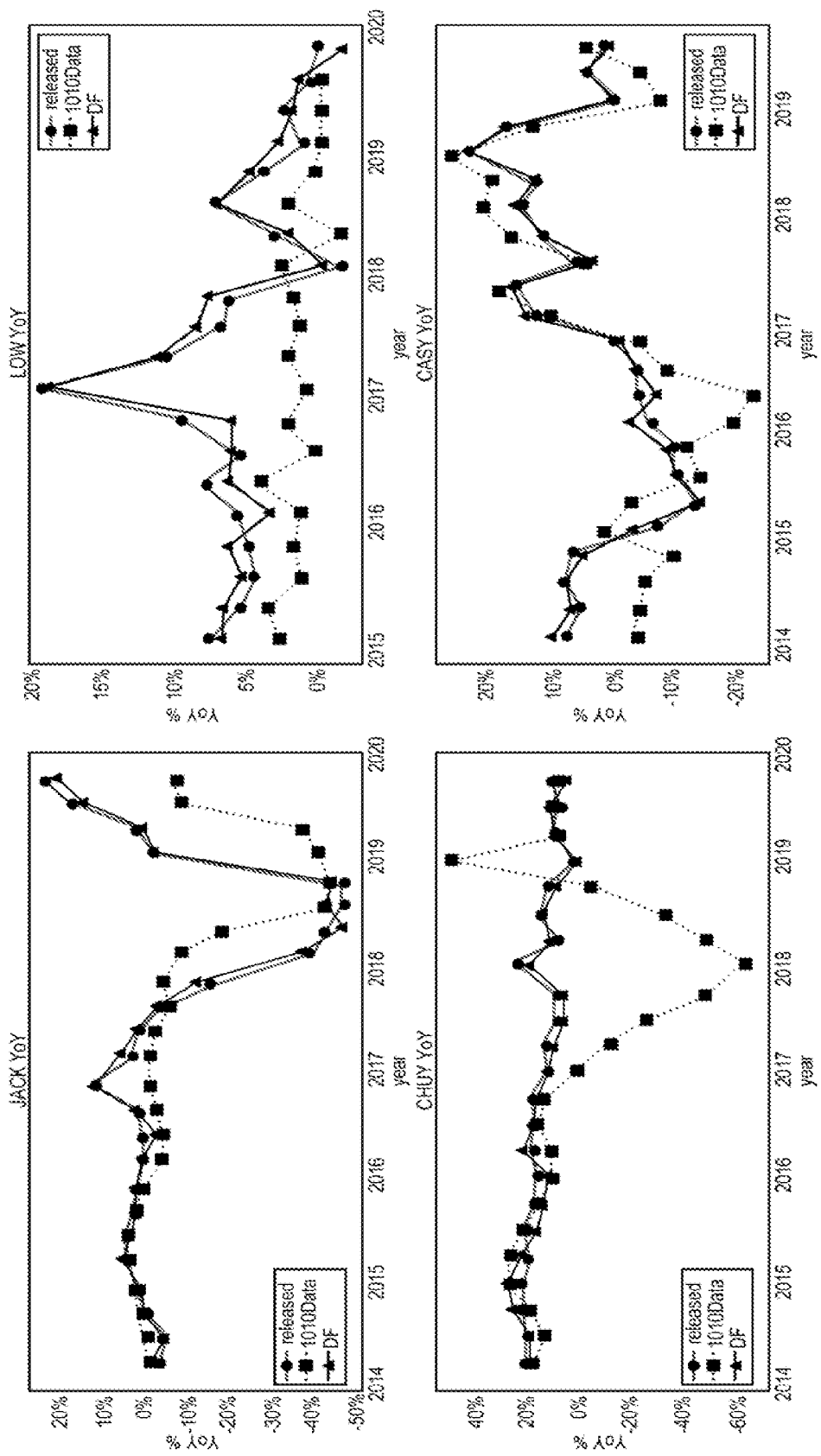

FIGS. 22A and 22B illustrate various examples of comparison with data. FIG. 22A includes franchising examples, and FIG. 22B includes examples of companies with a history of acquisitions, or anomalies.

Figure 23:
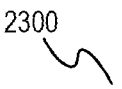
FIGS. 23-24 illustrate various example implementations.

FIG. 23 illustrates a comparison between results according to the example implementations and the related art approaches. As can be seen in the column indicated as "DF" for the example implementations, and "1010 Data" for the related art approaches, a substantial difference in the forecasting results shows substantially improved performance for the example implementations.

Figure 24:
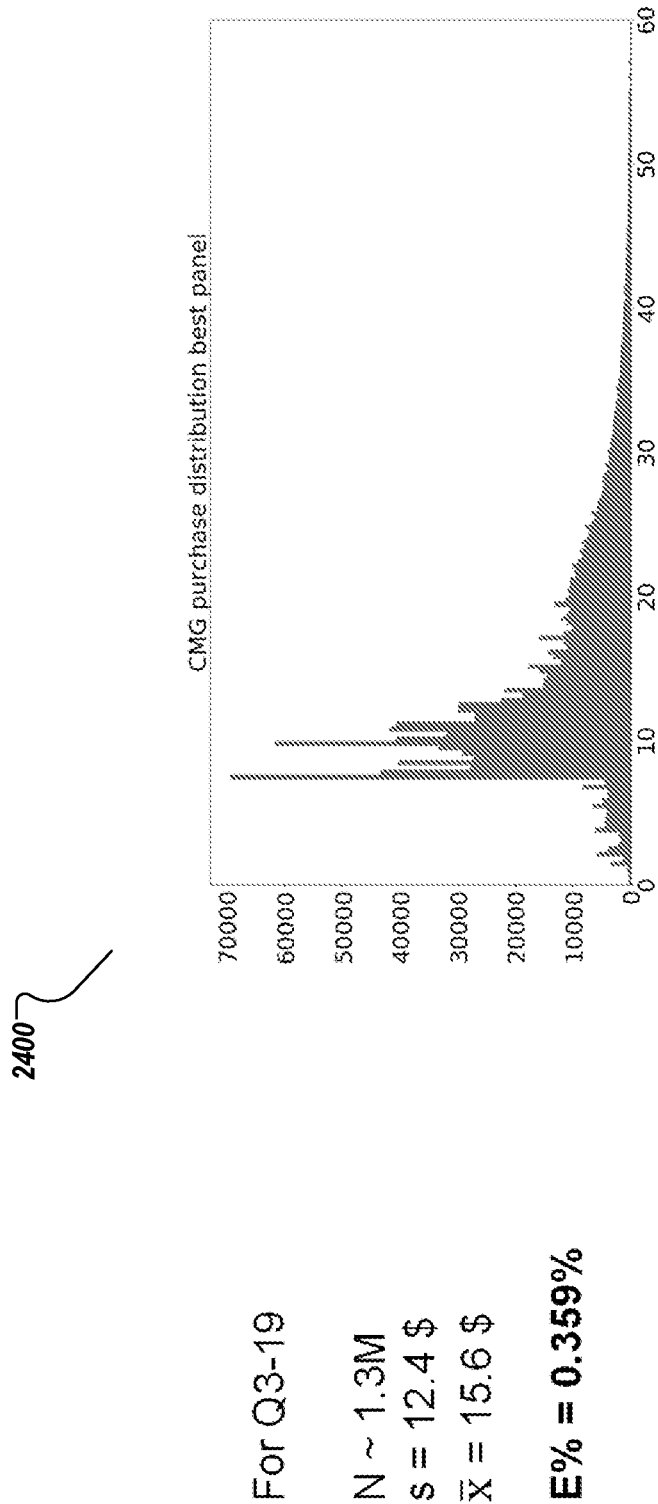

FIG. 24 illustrates the technical basis according to statistical methods for the determination of the panel size, and the measurement of the real statistical error.

From the central limit theorem, the theoretical % error for the forecast is given by $$E\,\%\propto \frac{1}{\sqrt{\bar{n}}}\frac{s}{\bar{x}}$$

The Error % in the forecast is proportional to the sample standard deviation of the purchases and inverse to the square root of the purchase number and the average amount.

That means that the panel size is adequate to generate accurate predictions.

The real statistical error is even smaller, because we use the previously released revenues to correct and adjust the data.

The above-disclosed hardware implementations may be used to process the operations of FIGS. 18-24, as would be understood by those skilled in the art. More specifically, For example, but not by way of limitation, external data fetching according to the example implementations described herein may be perforated by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Example Environment

Figure 25:
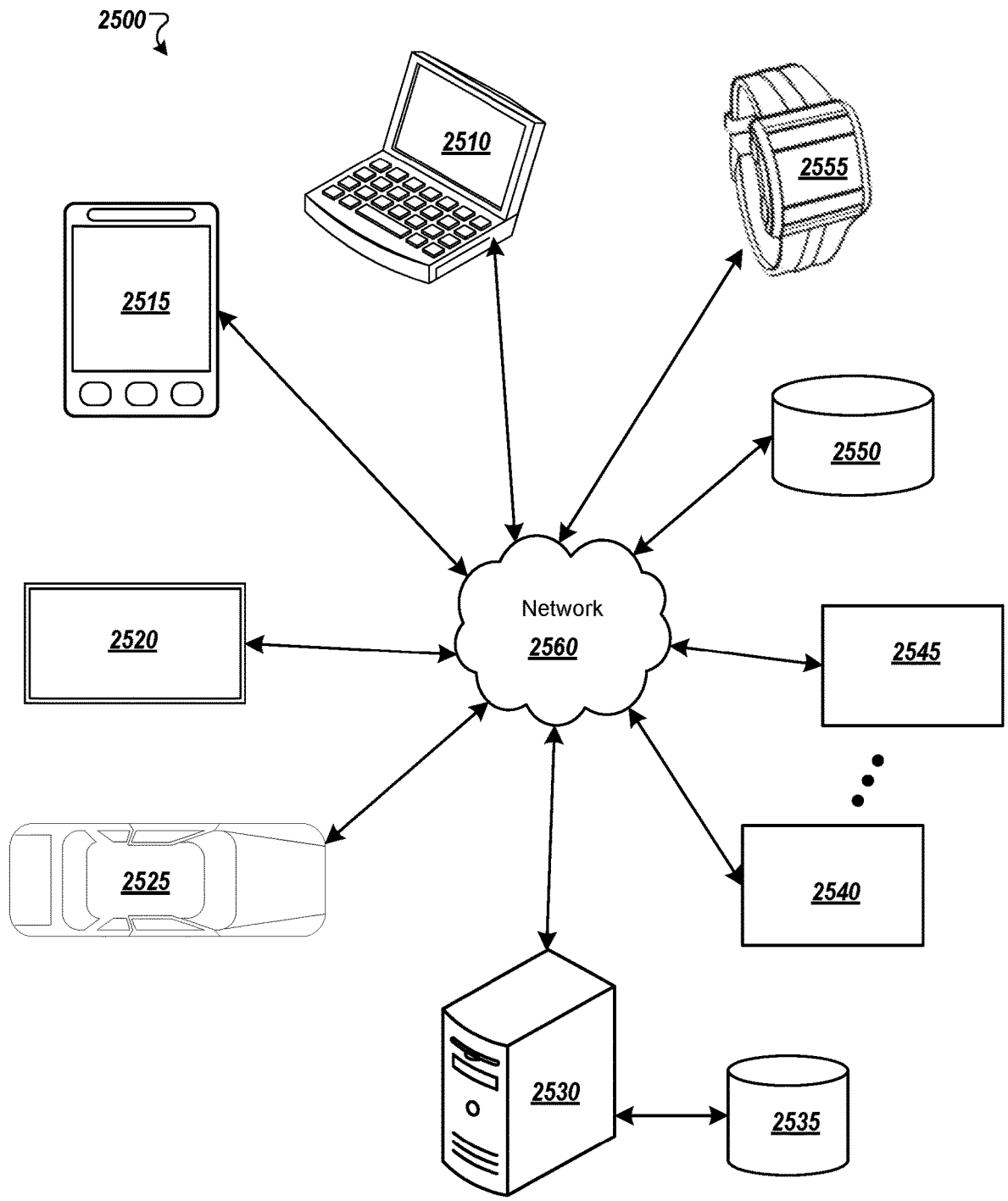
FIG. 25 illustrates an example environment according to an example implementation of the present application.

FIG. 25 shows an example environment suitable for some example implementations. Environment 2500 includes devices 2510-2555, and each is communicatively connected to at least one other device via, for example, network 2560 (e.g., by wired and/or wireless connections). Some devices may be communicatively connected to one or more storage devices 2540 and 2545.

Figure 26:
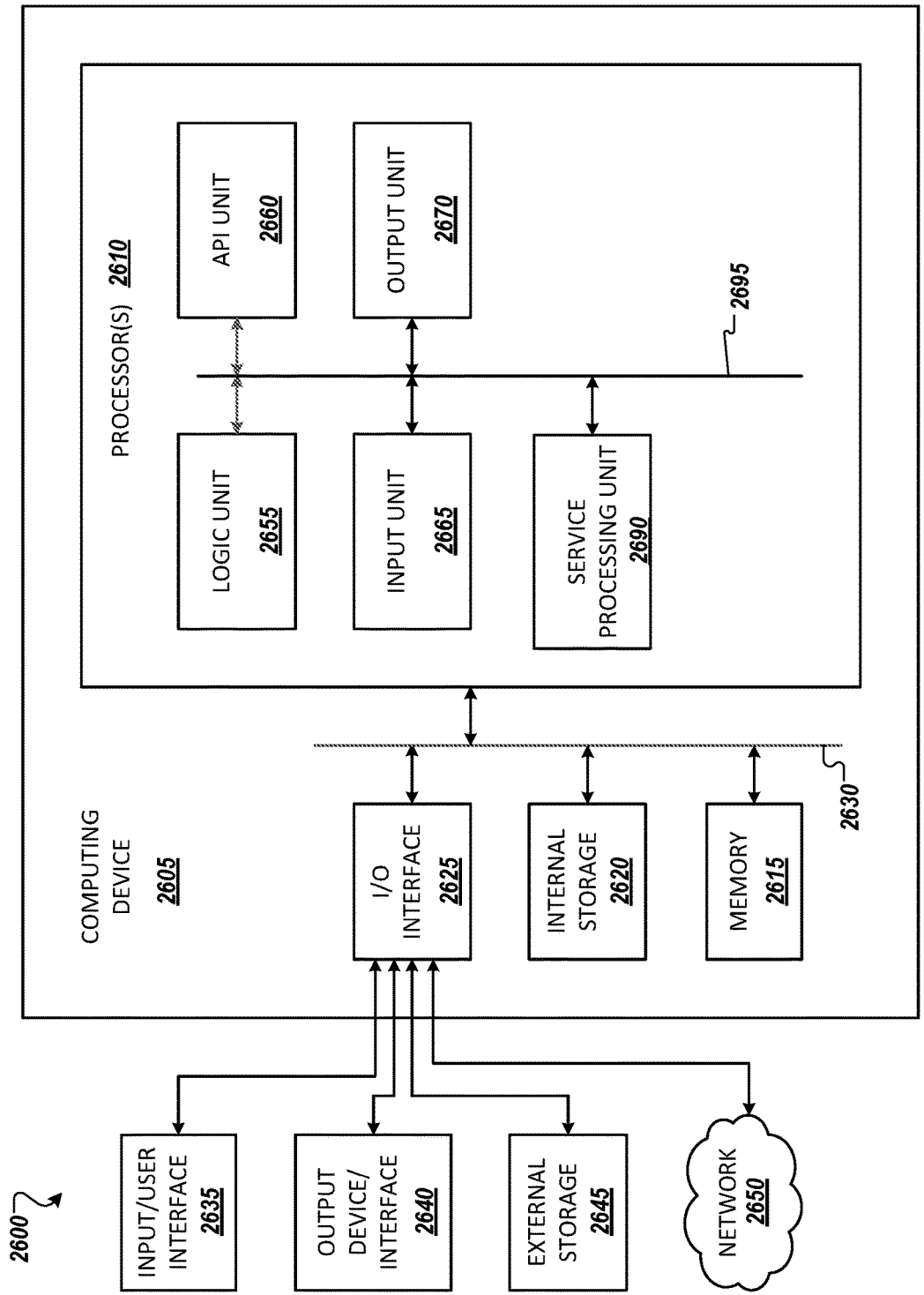
FIG. 26 illustrates an example computing environment with an example computer device suitable for use in some example implementations.

An example of one or more devices 2510-2555 may be computing devices 2600 described in FIG. 26, respectively. Devices 2505-2555 may include, but are not limited to, a computer 2510 (e.g., a laptop computing device) having a monitor, a mobile device 2515 (e.g., smartphone or tablet), a television 2520, a device associated with a vehicle 2525, a server computer 2530, computing devices 2535 and 2550, storage devices 2540 and 2545, and smart watch or other smart device 2555.

In some implementations, devices 2510-2525 and 2555 may be considered user devices associated with the users of the enterprise. Devices 2530-2550 may be devices associated with service providers (e.g., used by the external host to provide services as described above and with respect to the collecting and storing data).

The above-disclosed hardware implementations may be used in the environment of FIG. 25, as would be understood by those skilled in the art. More specifically, For example, but not by way of limitation, external data fetching according to the example implementations described herein may be performed by copying data from an external third party (e.g., vendor), and storing the data in a cloud storage container. The data fetching process may be managed by a scheduling server, and/or a serverless compute service that executes operations to manage the external data storage and the associated compute resources. Further, the extraction, transformation and loading of data as described herein may be executed by a batch management processor or service. Batch computing is the execution of a series of executable instructions ("jobs") on one or more processors without manual intervention by a user, e.g., automatically. Input parameters maybe pre-defined through scripts, command-line arguments, control files, or job control language. A batch job may be associated with completion of preceding jobs, or the availability of certain inputs. Thus, the sequencing and scheduling of multiple jobs is critical. Optionally, batch processing may not be performed with interactive processing. For example, the batch management processor or service may permits a user to create a job queue and job definition, and then to execute the job definition and review the results. According to an example implementation a batch cluster includes 256 CPUs, and an ETL-dedicated server having 64 cores and 312 GB of RAM. The number of running instances may be 1. The foregoing ETL infrastructure may also be applied to the process of insight extraction. Further, an API is provided for data access. For example but not by way of limitation, the REST API, which conforms to a REST style architecture and allows for interaction with RESTful resources, may be executed on a service. The service may include, but is not limited to, hardware such as 1 vCPU, 2 GB RAM, 10 GB SSD disk, and a minimum of two running instances. The API may be exposed to the Internet via an online application load balancer, which is elastic and permits configuration and routing of an incoming end-user to online applications based in the cloud, optionally pushing traffic across multiple targets in multiple availability zones. The caching layer may be provided by a fast content delivery network (CDN) service, which may securely deliver the data described herein with low latency and high transfer speeds. According to the example implementations, containers may be run without having to manage servers or clusters of instances, such that there is no need to provision, configure, or scale clusters on virtual machines to execute operations associated with containers.

Example Computing Environment

FIG. 26 shows an example computing environment with an example computing device suitable for implementing at least one example embodiment. Computing device 2605 in computing environment 2600 can include one or more processing units, cores, or processors 2610, memory 2615 (e.g., RAM, ROM, and/or the like), internal storage 2620 (e.g., magnetic, optical, solid state storage, and/or organic), and I/O interface 2625, all of which can be coupled on a communication mechanism or bus 2630 for communicating information. Processors 2610 can be general purpose processors (CPUs) and/or special purpose processors (e.g., digital signal processors (DSPs), graphics processing units (GPUs), and others).

In some example embodiments, computing environment 2600 may include one or more devices used as analog-to-digital converters, digital-to-analog converters, and/or radio frequency handlers.

Computing device 2605 can be communicatively coupled to input/user interface 2635 and output device/interface 2640. Either one or both of input/user interface 2635 and output device/interface 2640 can be wired or wireless interface and can be detachable. Input/user interface 2635 may include any device, component, sensor, or interface, physical or virtual, which can be used to provide input (e.g., keyboard, a pointing/cursor control, microphone, camera, Braille, motion sensor, optical reader, and/or the like). Output device/interface 2640 may include a display, monitor, printer, speaker, braille, or the like. In some example embodiments, input/user interface 2635 and output device/interface 2640 can be embedded with or physically coupled to computing device 2605 (e.g., a mobile computing device with buttons or touch-screen input/user interface and an output or printing display, or a television).

Computing device 2605 can be communicatively coupled to external storage 2645 and network 2650 for communicating with any number of networked components, devices, and systems, including one or more computing devices of the same or different configuration. Computing device 2605 or any connected computing device can be functioning as, providing services of, or referred to as a server, client, thin server, general machine, special-purpose machine, or another label.

I/O interface 2625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 2600. Network 2650 can be any network or combination of networks (e.g., the Internet, local area network, wide area network, a telephonic network, a cellular network, satellite network, and the like).

Computing device 2605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 2605 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 2610 can execute under any operating system (OS) (not shown), in a native or virtual environment. To implement a described embodiment, one or more online applications can be deployed that include logic unit 2655, application programming interface (API) unit 2660, input unit 2665, output unit 2670, service processing unit 2690, and inter-unit communication mechanism 2695 for the different units to communicate with each other, with the OS, and with other applications (not shown). For example, alternate data processing unit 2675, tagging unit 2680, and modeling/forecasting unit 2685 may implement one or more processes described above. The described units and elements can be varied in design, function, configuration, or implementation and are not limited to the descriptions provided.

In some example embodiments, when information or an execution instruction is received by API unit 2660, it may be communicated to one or more other units (e.g., logic unit 2655, input unit 2665, output unit 2670, service processing unit 2690). For example, input unit 2665 may use API unit 2660 to connect with other data sources so that the service processing unit 2690 can process the information. Service processing unit 2690 performs the filtering of panelists, the filtering and cleaning/normalizing of data, and generation of the results, as explained above.

In some examples, logic unit 2660 may be configured to control the information flow among the units and direct the services provided by API unit 2660, input unit 2665, output unit 2670, alternate data processing unit 2675, tagging unit 2680, and modeling/forecasting unit 2685 in order to implement an embodiment described above. For example, the flow of one or more processes or implementations may be controlled by logic unit 2655 alone or in conjunction with API unit 2665.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

I claim:

1. A computer-implemented method comprising:
   receiving, by an online application associated with a user device, user preference information, and transmitting the user preference information to a server;
   determining, by the server, one or more user settings based on the received user preference information, wherein the one or more user settings comprises a price limit associated with the user preference information;
   training, by the server, a neural network prediction model using back propagation based on a plurality of alternate data inputs of different types associated with at least one company;
   applying, by the server, the neural network prediction model to new data from a plurality of data sources to generate a forecasted value of a critical indicator of the at least one company;
   determining, by the server, a data condition based on the forecasted value of the critical indicator of the at least one company;
   providing, by the server, an electronic notification indicative of the data condition to the user device based at least on the price limit of the one or more user settings, wherein the electronic notification includes a recommendation associated with the at least one company based on the data condition, and a user prompt to perform a user request in accordance with the recommendation; and
   executing, by the server, the user request in response to a single user input to the user device to select the user prompt, wherein executing the user request comprises automatically submitting an order, in accordance with the recommendation, to a brokerage service without further input from the user,
   wherein training the neural network prediction model using back propagation comprises:
      receiving, by the server, the plurality of alternate data inputs of different types from a plurality of alternate data providers, each of the plurality of alternate data providers having different types of data;
      standardizing, by the server, the plurality of alternate data inputs of different types received in real-time from the plurality of alternate data providers by performing filtering, de-duplication, normalization, and classification;
      receiving, by a modelling system for the neural network prediction model executed by the server, the standardized plurality of alternate data inputs of different types and published information of the at least one company, the modelling system employing neural networks to generate, as an output, the forecasted value of the critical indicator of the at least one company;

receiving the output as the forecasted value of the critical indicator of the at least one company in real-time, comprising one or more revenue predictions; and performing, by the server, model validation using historical data associated with the at least one company using back propagation to periodically update the neural network prediction model;

for the neural network prediction model being determined as not successfully validated, iteratively performing, by the server, retraining and updating of the neural network prediction model until the neural network prediction model is successfully validated.

2. The computer-implemented method of claim 1, wherein the user preference information comprises risk information, financial information, or demographic information received via the online application, wherein determining the one or more user settings comprises determining the price limit based on at least one of the risk information, financial information, or demographic information received via the online application.

3. The computer-implemented method of claim 2, wherein the risk information comprises a timing preference to execute the user request, a first frequency preference to execute the user request, an amount preference to execute the user request, a second frequency preference over a prescribed period to execute the user request, and a broker and market preference associated with one or more respective brokers and markers, to execute the user request, wherein executing the user request comprises executing the user request based on the timing preference, the first frequency preference, the amount preference, the second frequency preference, and the broker and market preference.

4. The computer-implemented method of claim 1, further comprising providing the electronic notification to the user device via the online application on a periodic basis at a prescribed time based on the one or more user settings.

5. The computer-implemented method of claim 1, wherein the data condition is associated with a plurality of entities provided in the user preference information, and the user prompt includes the user request for all of the plurality of entities.

6. The computer-implemented method of claim 1, wherein the user device comprises an automobile or a home device, and the user prompt comprises an audio command.

7. The computer-implemented method of claim 1, wherein the single user input is a privacy preserving gesture provided in the user preference information.

8. The computer-implemented method of claim 1, further comprising determining the one or more user settings based on the user preference information associated with a risk profile, and upcoming or prior user events associated with a user financial condition.

9. A computer-implemented method comprising:
receiving, by an online application associated with a user device, user preference information, and transmitting the user preference information to a server;
determining, by the server, one or more user settings based on the received user preference information, wherein the one or more user settings comprises a price limit associated with the user preference information;
training, by the server, a neural network prediction model using back propagation based on a plurality of alternate data inputs of different types associated with at least one company;
applying, by the server, the neural network prediction model to new data from a plurality of data sources to generate a forecasted value of a critical indicator of the at least one company;
determining, by the server, a data condition based on the forecasted value of the critical indicator of the at least one company;
providing, by the server, an electronic notification indicative of the data condition to the user device based at least on the price limit of the one or more user settings, wherein the electronic notification includes a recommendation associated with the at least one company based on the data condition, and a query to perform an automated user request in accordance with the recommendation; and
executing, by the server, the automated user request in response to an automated determination to perform the automated user request based on the one or more user settings, wherein executing the automated user request comprises automatically submitting an order, in accordance with the recommendation, to a brokerage service without further input from the user,
wherein training the neural network prediction using model back propagation comprises:
receiving, by the server, the plurality of alternate data inputs of different types from a plurality of alternate data providers, each of the plurality of alternate data providers having different types of data;
standardizing, by the server, the plurality of alternate data inputs of different types received in real-time from the plurality of alternate data providers by performing filtering, de-duplication, normalization, and classification;
receiving, by a modelling system for the neural network prediction model executed by the server, the standardized plurality of alternate data inputs of different types and published information of the at least one company, the modelling system employing neural networks to generate, as an output, the forecasted value of the critical indicator of the at least one company;
receiving the output as the forecasted value of the critical indicator of the at least one company in real-time, comprising one or more revenue predictions; and
performing, by the server, model validation using historical data associated with the at least one company using back propagation to periodically update the neural network prediction model;
for the neural network prediction model being determined as not successfully validated, iteratively performing, by the server, retraining and updating of the neural network prediction model until the neural network prediction model is successfully validated.

10. The computer-implemented method of claim 9, wherein the user preference information comprises risk information, financial information, or demographic information, wherein determining the one or more user settings comprises determining the price limit based on at least one of the risk information, financial information, or demographic information received via the online application.

11. The computer-implemented method of claim 10, wherein the risk information comprises a timing preference to execute the automated user request, a first frequency preference to execute the automated user request, an amount preference to execute the automated user request, a second frequency preference over a prescribed period to execute the automated user request, and a broker and market preference associated with one or more respective brokers and markers, to execute the automated user request, wherein executing the automated user request comprises executing the automated user request based on the timing preference, the first frequency preference, the amount preference, the second frequency preference, and the broker and market preference.

12. The computer-implemented method of claim 9, further comprising providing the electronic notification to the user device via the online application on a periodic basis at a prescribed time based on the one or more user settings.

13. The computer-implemented method of claim 9, wherein the data condition is associated with a plurality of entities provided in the user preference information.

14. The computer-implemented method of claim 9, determining the one or more user settings based on the user preference information associated with a risk profile, and upcoming or prior user events associated with a user financial condition.

* * * * *